(12) United States Patent
Chen et al.

(10) Patent No.: US 11,107,377 B2
(45) Date of Patent: Aug. 31, 2021

(54) PROJECTED INFORMATION DISPLAY FOR IT EQUIPMENT ENVIRONMENTS

(71) Applicant: Dell Products L.P., Round Rock, TX (US)

(72) Inventors: Zhao Chen, Shanghai (CN); Peter Timothy Clark, Taipei (TW); Hsiang-Yin Hung, Taipei (TW); Wei-Ti Kuo, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/658,609

(22) Filed: Oct. 21, 2019

(65) Prior Publication Data

US 2021/0118342 A1 Apr. 22, 2021

(51) Int. Cl.
*G06T 19/00* (2011.01)
*G09G 3/00* (2006.01)
*G06T 11/00* (2006.01)
*G06Q 10/00* (2012.01)

(52) U.S. Cl.
CPC ............ *G09G 3/001* (2013.01); *G06Q 10/20* (2013.01); *G06T 11/00* (2013.01); *G06T 19/006* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2002/0107674 A1* | 8/2002 | Bascle | G06F 3/011 703/1 |
| 2013/0063487 A1* | 3/2013 | Spiegel | G06Q 30/02 345/633 |
| 2015/0279113 A1* | 10/2015 | Knorr | G06T 7/11 345/633 |
| 2016/0140868 A1* | 5/2016 | Lovett | G06T 19/006 434/118 |
| 2019/0121522 A1* | 4/2019 | Davis | G06F 3/04815 |
| 2020/0271450 A1* | 8/2020 | Gorur Sheshagiri | G06N 3/02 |
| 2020/0368616 A1* | 11/2020 | Delamont | A63F 13/25 |

OTHER PUBLICATIONS

NPL_BMW_AR_Frames.pdf, https://www.youtube.com/watch?v=P9KPJIA5yds Oct. 3, 2007 (Year: 2007).*

* cited by examiner

*Primary Examiner* — Steven Z Elbinger
(74) *Attorney, Agent, or Firm* — Terrile, Cannatti & Chambers, LLP; Stephen A. Terrile

(57) ABSTRACT

A system, method, and computer-readable medium are disclosed for performing a projected equipment information operation within an IT environment. In various embodiments, the projected equipment information operation includes: receiving equipment information regarding an information handling system within the IT environment; identifying AR content associated with the equipment information regarding the information handling system within the IT environment; and, projecting the AR content associated with the equipment information onto a physical device within the IT environment, a combination of the AR content and the physical device providing a composite view, the composite view providing a hands free and device free provision of the equipment information.

20 Claims, 44 Drawing Sheets

US 11,107,377 B2

PROJECTED INFORMATION DISPLAY FOR IT EQUIPMENT ENVIRONMENTS

BACKGROUND OF THE INVENTION

Field of the Invention

The present invention relates to information handling systems. More specifically, embodiments of the invention relate to a projecting equipment information within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers. In such IT environments, an IT administrator is often used to perform equipment operations including repair, maintenance and deployment operations

SUMMARY OF THE INVENTION

A system, method, and computer-readable medium are disclosed for performing a projected equipment information operation.

In one embodiment, the invention relates to a computer-implementable method for performing a projected equipment operation within an IT environment, comprising: receiving equipment information regarding an information handling system within the IT environment; identifying AR content associated with the equipment information regarding the information handling system within the IT environment; projecting the AR content associated with the equipment information onto a physical device within the IT environment, a combination of the AR content and the physical device providing a composite view, the composite view providing a hands free and device free provision of the equipment information.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving equipment information regarding an information handling system within the IT environment; identifying AR content associated with the equipment information regarding the information handling system within the IT environment; projecting the AR content associated with the equipment information onto a physical device within the IT environment, a combination of the AR content and the physical device providing a composite view, the composite view providing a hands free and device free provision of the equipment information.

In another embodiment, the invention relates to non-transitory, computer-readable storage medium embodying computer program code, the computer program code comprising computer executable instructions configured for: receiving equipment information regarding an information handling system within the IT environment; identifying AR content associated with the equipment information regarding the information handling system within the IT environment; projecting the AR content associated with the equipment information onto a physical device within the IT environment, a combination of the AR content and the physical device providing a composite view, the composite view providing a hands free and device free provision of the equipment information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
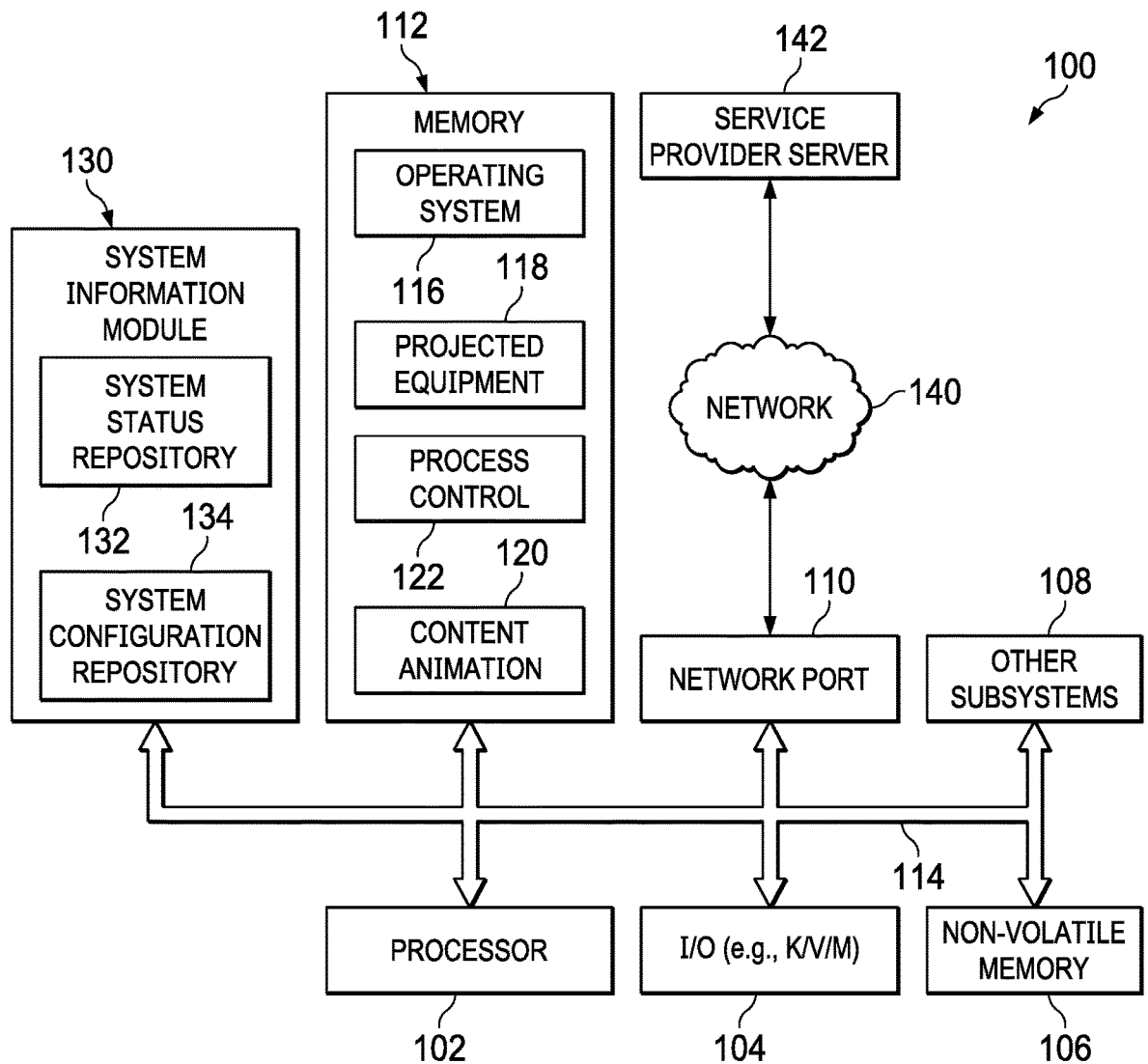
FIG. 1 shows a general illustration of components of an information handling system as implemented in the system and method of the present invention.

Various aspects of the disclosure include an appreciation that the complexity of maintaining enterprise information technology (IT) equipment such as that included within a data center increases every generation as the component density surges to achieve higher performance. The IT equipment information provided to an IT administrator during equipment operations such as repair operations, maintenance operations and deployment operations is becoming ever more important. This IT equipment information can influence the efficiency and user experience of the IT administrator.

Various aspects of the disclosure include an appreciation that known solutions for providing IT equipment information include printing instructions on some or all of the devices within the IT environment or providing a Quick Resource Locator (QRL) such as the Dell EMC Quick Resource Locator (QRL) via which the IT administrator can access the QRL content regarding IT equipment from a user device. However, including printed instructions on the IT equipment can be challenging due to space and cost concerns. Additionally, access to the QRL content may unavailable in restricted data centers where Internet connection and/or personal devices are often prohibited. Also, with information provided via a QRL, the instruction can be limited by the type of user device that is accessing the information.

Various aspects of the disclosure include an appreciation that identifying, locating and/or cabling an enterprise product inside an IT environment, among other hundreds or thousands of pieces of equipment can be challenging and time consuming. Various aspects of the disclosure include an appreciation that it can be difficult to access and interact with hardware components within individual pieces of equipment because of the increasing density inside the chassis of the information handling system. Accordingly, it is desirable to provide detailed instruction to guide the users through equipment operations. Various aspects of the disclosure include an appreciation that the space for marking the hardware components within individual pieces of equipment can be limited. Additionally, numbering of components may be changed based on the particular configuration of the equipment, either during the manufacturing process or during the lifetime of the equipment. Guiding the users to locate the correct components can be challenging and removing the wrong component can result in data loss. Various aspects of the disclosure include an appreciation that users often don't know for sure whether a hardware component is working properly after the component is installed or replaced. Even with systems that have a system health indicator the information communicated through indicator is often very limited.

A system, method, and computer-readable medium are disclosed for performing an equipment information projector operation. Such an equipment information projector operation allows for hands free and device free provision of IT equipment information. The equipment information projector operation proactively assists IT administrators to locate particular information handling systems within large IT environments (i.e., in anticipation of performance of an action with the information handling system). The equipment information projector operation provides improved discoverability and legibility of IT equipment information. In various embodiments, the equipment information projector operation allows IT administrators to quickly and easily obtain information regarding the status of equipment within the IT environment. In various embodiments, the equipment information projector operation presents augmented reality graphics to guide the IT administrator intuitively through equipment operations such as repair operations, maintenance operations and deployment operations. In various embodiments, the equipment information projector operation presents augmented reality graphics to guide the IT administrator intuitively through IT environment status operations such as a regular review of operational status of equipment within the IT environment, a review of inventory within the IT environment and a safety review within the IT environment. In various embodiments, the equipment information projector operation presents augmented reality graphics which displays service information directly onto the IT equipment within the IT environment. In various embodiments, the equipment information projector operation presents augmented reality graphics which displays real-time service information directly on the equipment which can guide IT administrators through service procedures.

The equipment information projector operation projects service information for information handling systems within IT environments. Information is projected directly onto the equipment to be serviced. It guides the users through daily checkup, and projects the step-by-step guidance needed during troubleshooting and repair onto the hardware components. The equipment information projector operation provides a hands-free assistant that resides in the data center. The display is interactive and compatible with present and future information handing system rack systems.

The equipment information projector operation projects service information for data center environments. Information is projected directly onto the equipment to be serviced. The equipment information projector operation guides the users through daily checkup, and projects the step-by-step guidance needed during troubleshooting and repair onto the hardware components.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one of a projected equipment information module 118, a content animation module 120 and a process control module 122. In certain embodiments, the information handling system 100 includes a system information module 130.

A projected equipment information module 118 performs a projected equipment information operation. In certain embodiments, the projected equipment information operation allows for hands free and device free provision of IT equipment information (i.e., the IT service personnel does not need a personal device to access the equipment information. In certain embodiments, the projected equipment information operation proactively assists IT administrators to locate particular information handling systems within large IT environments. The projected equipment information operation provides improved discoverability and legibility of IT equipment information. In various embodiments, the equipment information projector operation allows IT administrators to quickly and easily obtain information regarding the status of equipment within the IT environment. In various embodiments, the projected equipment information operation presents augmented reality graphics to guide the IT administrator intuitively through equipment operations such as repair operations, maintenance operations and deployment operations. In various embodiments, the projected equipment information operation presents augmented reality graphics to guide the IT administrator intuitively through IT environment status operations such as a regular review of operational status of equipment within the IT environment, a review of inventory within the IT environment and a safety review within the IT environment. In various embodiments, the projected equipment information operation presents augmented reality graphics which displays service information directly onto the IT equipment within the IT environment. In various embodiments, the projected equipment information operation presents augmented reality graphics which displays real-time service information directly on the equipment which can guide IT administrators through service procedures.

A content animation module 120 performs a content animation operation. In certain embodiments, the content animation module 120 receives servicing information, identifies a component based on the servicing information, and generates or retrieves animated content related to the installation or removal of the component. In certain embodiments, the content animation module 120 generates content based on a position or orientation of a piece of equipment within the IT environment.

The process control module 122 performs a process control operation. The process control module 122 monitors the state of the system during a servicing operation. The process control module 122 also monitors the position and orientation of the piece of equipment. In certain embodiments, if the process control module determines an action required during a servicing operation will require more time for a user to complete, the process control module pauses the animated content. In certain embodiments, if the process control module 122 determines an action required during a servicing operation will require the user to view the system from another angle to understand how to complete a task, the process control module 122 communicates with the animated content module 120 to deliver animated content that can be rotated, zoomed in, or otherwise modified for better understanding.

In certain embodiments, the information handling system 100 is included as one of a plurality of information handling systems within a data center. In certain embodiments, some or all of the information handling systems 100 in the data center include in-band or out-of-band (OoB) functionality so that users can access server system status and configuration information. In certain embodiments, the system information module 130 includes one or more of a system status repository 132 and a system configuration repository 134.

Figure 2:
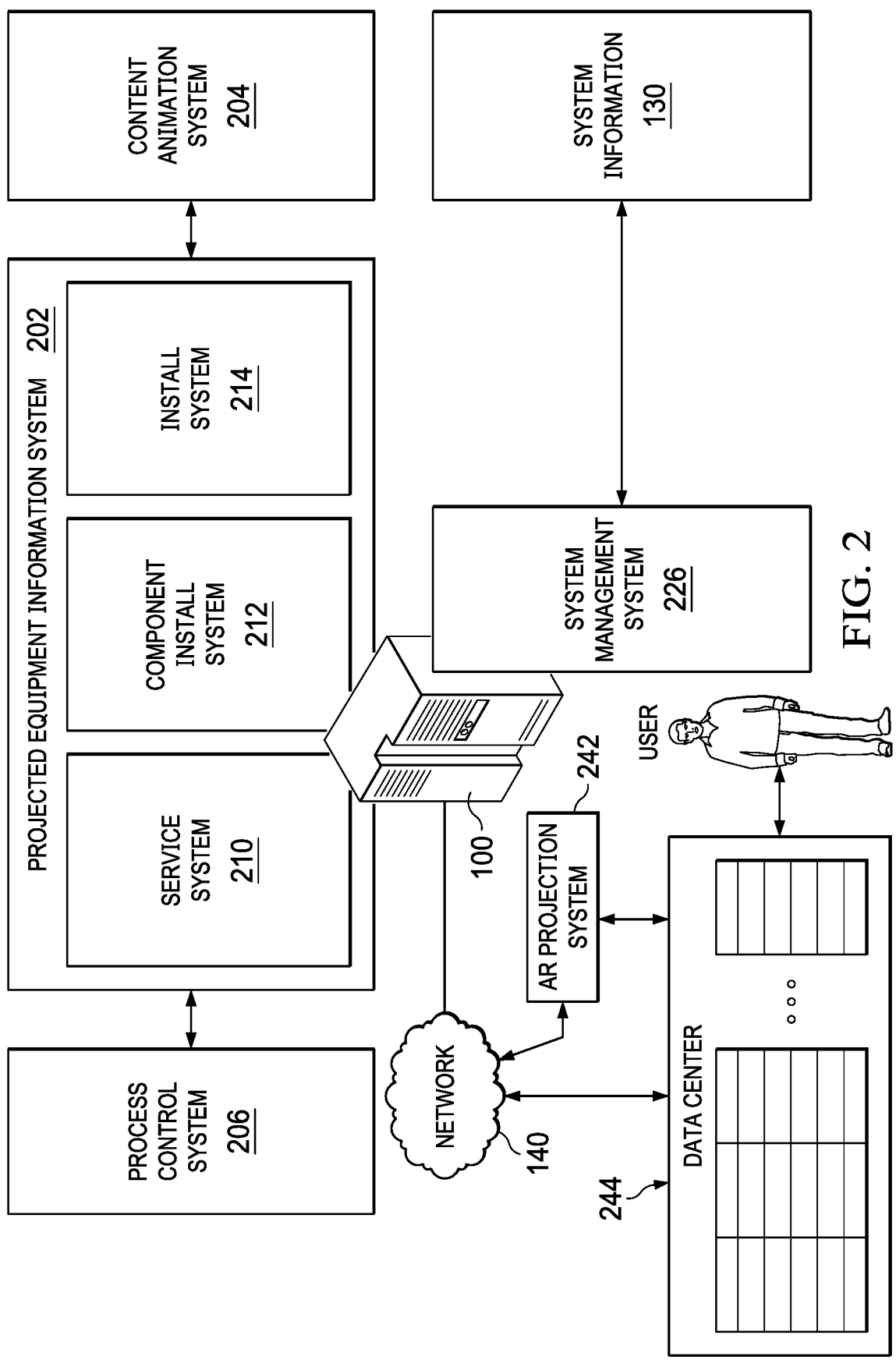
FIG. 2 shows a block diagram of a projected equipment information environment.

FIG. 2 shows a block diagram of a projected equipment information environment 200 implemented in accordance with an embodiment of the invention. The projected equipment information environment 200 includes a projected equipment information system 202, a content animation system 204 and a process control system 206. In certain embodiments, the projected equipment information system 202 includes a service system 210, a component install system 212 and an install system 214. In various embodiments, one or more of the projected equipment information system 202, the content animation system 204 and the process control system 206 executes on a hardware processor 102 of one or more information handling systems 100. In various embodiments, the projected equipment information system 202 performs some or all of the functions of the projected equipment information module 118, the content animation system 204 performs some or all of the functions of the content animation module 120 and the process control system 206 performs some or all of the functions of the process control module 122.

The projected equipment environment 200 includes a system management system 226. In certain embodiments, the system management system 226 collects data from system information module 130 installed in information handling systems 100 via a network. In certain embodiments, the system management system 226 functions in conjunction with the projected equipment information system 202 to facilitate generating content and controlling animation.

The projected equipment information environment 200 also includes an IT environment 240 as well as an AR projection system 242. In various embodiments, the IT environment comprises a data center 244. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective data center racks. As used herein a data center rack refers to a physical structure that is designed to house the information handling systems 100 as well as the associated cabling and power provision for the information handling systems. The physical structure provides equipment placement and orchestration within a data center facility. In certain embodiments, a plurality of racks are arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

As used herein, augmented reality (AR) refers to an operation that superimposes computer-generated content (i.e., AR content) onto a user's view of the real world, thus providing a composite view. As used herein, projected augmented reality refers to an operation that projects content onto a physical device thus providing a composite view of the content and the physical device. In certain embodiments, the content is projected onto a surface of the physical device. As used herein, an augmented reality projection system refers to device which includes a projector for generating AR content. In various embodiments, the AR projection system may also include one or more of a motor device which performs a conveyance function for the AR projection system, a camera, a location sensor and a motion detection sensor. In various embodiments, the AR projection system 242 is configured to generate projected augmented reality equipment information.

In various embodiments, the AR projection system 242 receives commands from a user to capture system and component information, communicates with projected equipment information system 202, the content animation system 204 and the process control system 206, through the use of a network 140. In various embodiments, the AR projection system 242 communicates with one or more of the system information repository 222, the system configuration repository 224 and the system management system 226 through the use of the network 140. In various embodiments, the projected equipment information system 202, the content animation system 204 and the process control system 206 communicate with one or more of the system information repository 222, the system configuration repository 224 and the system management system 226, through the use of the network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the system management system 226 performs a status monitoring operation on the information handling systems within the IT environment 240. In various embodiments, the system management system 226 generates service request relating to an information handling system within the IT environment 240. In various embodiments, the system management system 226 performs an inventory operation on the data center 244.

In various embodiments, the projected equipment information operation can facilitate a plurality of other types of operations performed within large scale IT environments. For example, the projected equipment information operation can facilitate status check operations, inventor check operation, safety check operations and troubleshooting operations.

The projected equipment information operation can provide AR content to intuitively guide a user through a status check operation. During a status check operation, the projected equipment AR operation can provide assistance with checking the status of the equipment within the IT environment such as the power supply, drive activity, operating temperature, component status and power consumption.

The projected equipment information operation can provide AR content to intuitively guide a user through an inventory check operation. During an inventory check operation, the projected equipment AR operation can provide assistance with displaying inventory list in the IT environment, displaying appropriate detail adjacent to related equipment/rack, comparing the data recorded in inventory with the customized label on server hardware and updating the record or label if discrepancy is found.

The projected equipment information operation can provide AR content to intuitively guide a user through a safety check operation. During a safety check operation, the projected equipment AR operation can provide assistance with one or more of: indicating hot (i.e., powered) components, when the cover is closed; indicating hot components, when the cover is open; and, indicating time remaining before risk of thermal failure when the cover is open.

Figure 3:
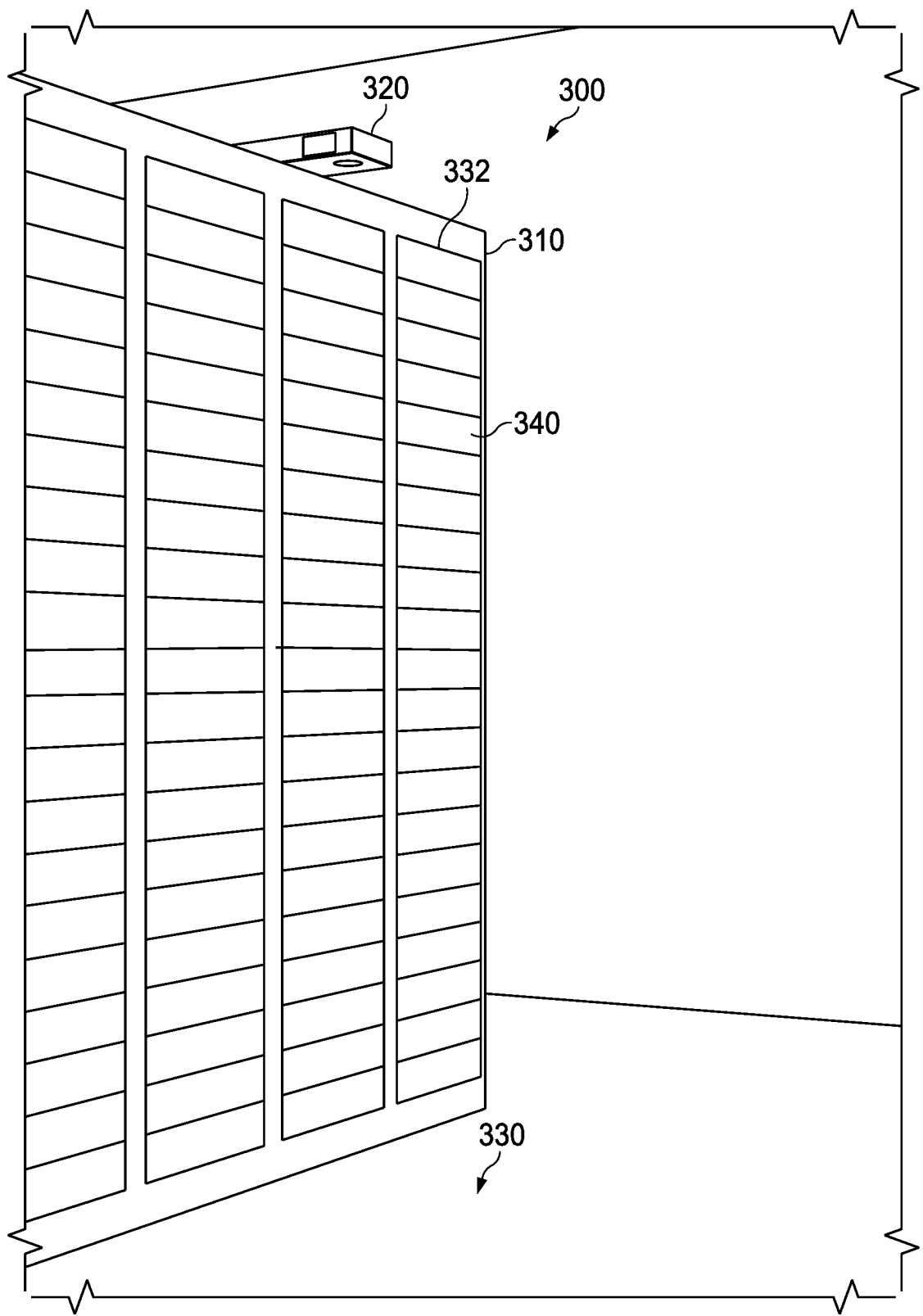
FIG. 3 shows a perspective view of a projected augmented reality IT environment.

FIG. 3 shows a perspective view of a projected augmented reality IT environment 300. The IT environment includes a data center rack 310 which includes a plurality of information handling systems 100. The IT environment 300 also includes an AR projection system 320 such as AR projection system 242. The AR projection system 320 is positioned with respect to the data center rack 310 so as to enable the AR projection system 320 to project AR content onto a physical portion of the IT environment 300 thus providing a composite view of the content and the physical portion of the IT environment 300 on which the content is projected. In various embodiments, the physical portion of the IT environment 300 can include a portion of the floor 330 located in front of a particular rack 332 of the IT environment 300. In various embodiments, the physical portion of the IT environment 300 can include the front, the rear or the interior of a particular information handling system 340 mounted within the data center rack 310 of the IT environment 300. Because the AR projection system 320 projects the content onto the physical portion of the IT environment 300 no handheld or wearable device needed when providing equipment information to an IT professional.

Figure 4:
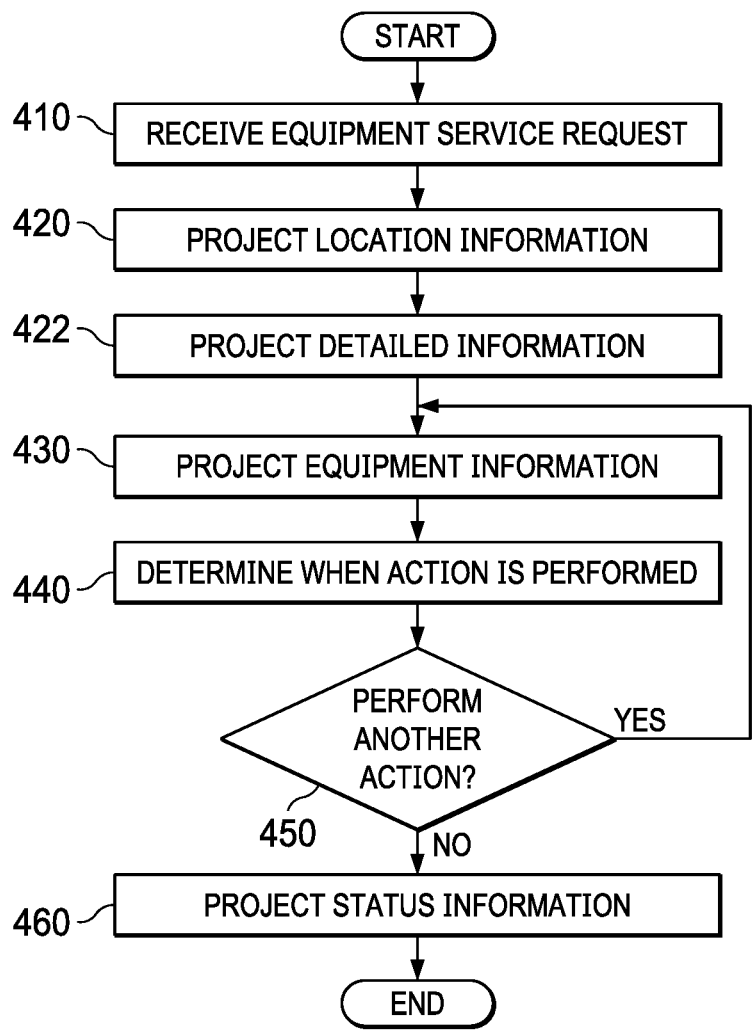
FIG. 4 shows a flow chart of a projected equipment service operation.

Referring to FIG. 4, a flow chart of a projected equipment service operation 400 is shown. In various embodiments, the projected equipment service operation 400 is controlled by the service system 210.

More specifically, the projected equipment service operation 400 starts at step 410 by the projected equipment information system 202 receiving an equipment service request associated with a service operation to be performed on an information handling system. In various embodiments, the service operation can include repair or replacement of a component within an information handling system 100. In certain embodiments, the equipment service request may be generated by the system management system 226. Next at step 420 the projected equipment information system 202 then causes the AR projection system 320 to project location information within the IT environment to indicate to an IT service personnel a location of the information handling system associated with the equipment service request. Next at step 422 upon detection of the IT service personnel being proximate to the location of the information handling system associated with the equipment service request the projected equipment system 200 causes the AR projection system 320 to project a more detailed message.

Next, at step 430, when the IT service personnel accesses the information handling system associated with the service request, the projected equipment information system 202 causes the AR projection system 320 to project an equipment information message onto the information handling system associated with the service request. In various embodiments, the equipment information message includes an action message which indicates an action to be performed by the IT service personnel. Next at step 540, the projected equipment information system 202 determines when the action is performed by the IT service personnel. In various embodiments, the determination may be made by information provided by a camera or motion sensor within the AR projection system 230, by information generated by the system management system 226 or a combination thereof.

Once it is determined that the action has been performed, the projected equipment information system 202 determines whether another action needs to be performed. If so, then the projected equipment information system 202 causes another equipment information message to be projected onto the information handling system. If not, then the projected equipment information system 202 causes the AR projection system 320 to project a status message onto the information handling system at step 560 and the projected equipment service operation 400 completes operation.

FIGS. 5A-5L show an example of projected equipment service operation. More specifically, referring to FIGS. 5A and 5B, the projected equipment service operation begins with the AR projection system 320 projecting a bold information message 510 onto the floor in front of a rack that contains an information handling system needing service. The bold information message 510 provides an indication of where the component requiring service is located within the IT environment. The AR content is visible in any lighting conditions with graphics that facilitate discoverability of a system needing service. The AR content includes legible service information.

In certain embodiments the AR content can alter depending on IT service personnel proximity, detected by motion detection sensors. For example, a one distance (e.g., a distance of over 10 feet), a bold warning message (e.g., message 510) is projected to attract the attention of the IT service personnel 515. At another distance (e.g., a distance of less than 10 feet), a more detailed message (e.g., message 520) is projected to provide more information regarding one or more of the equipment status, the issue and action to be performed by the IT service personnel 515.

Figure 5A:
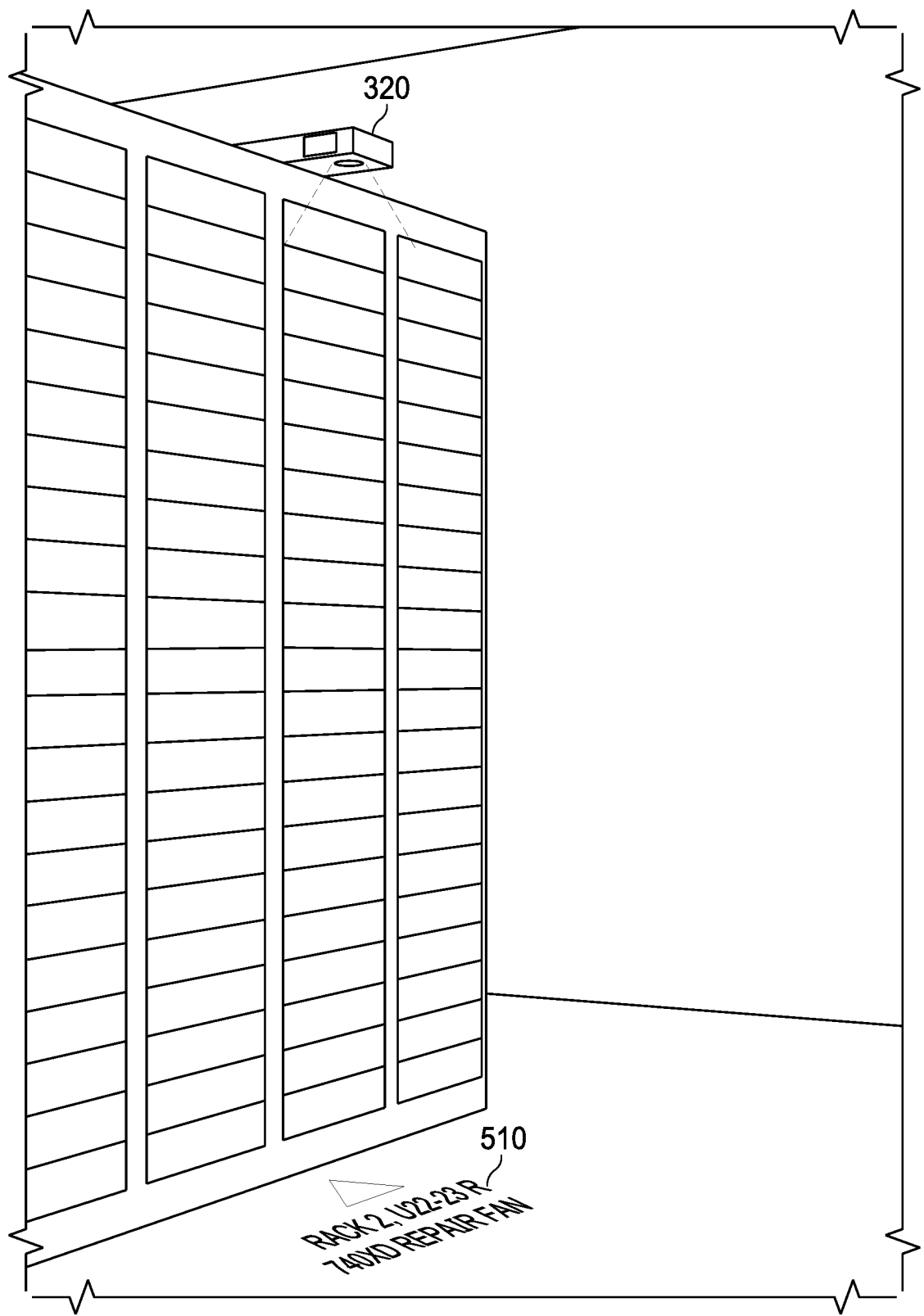
FIGS. 5A-5L show an example of projected equipment service operation.
Figure 5B:
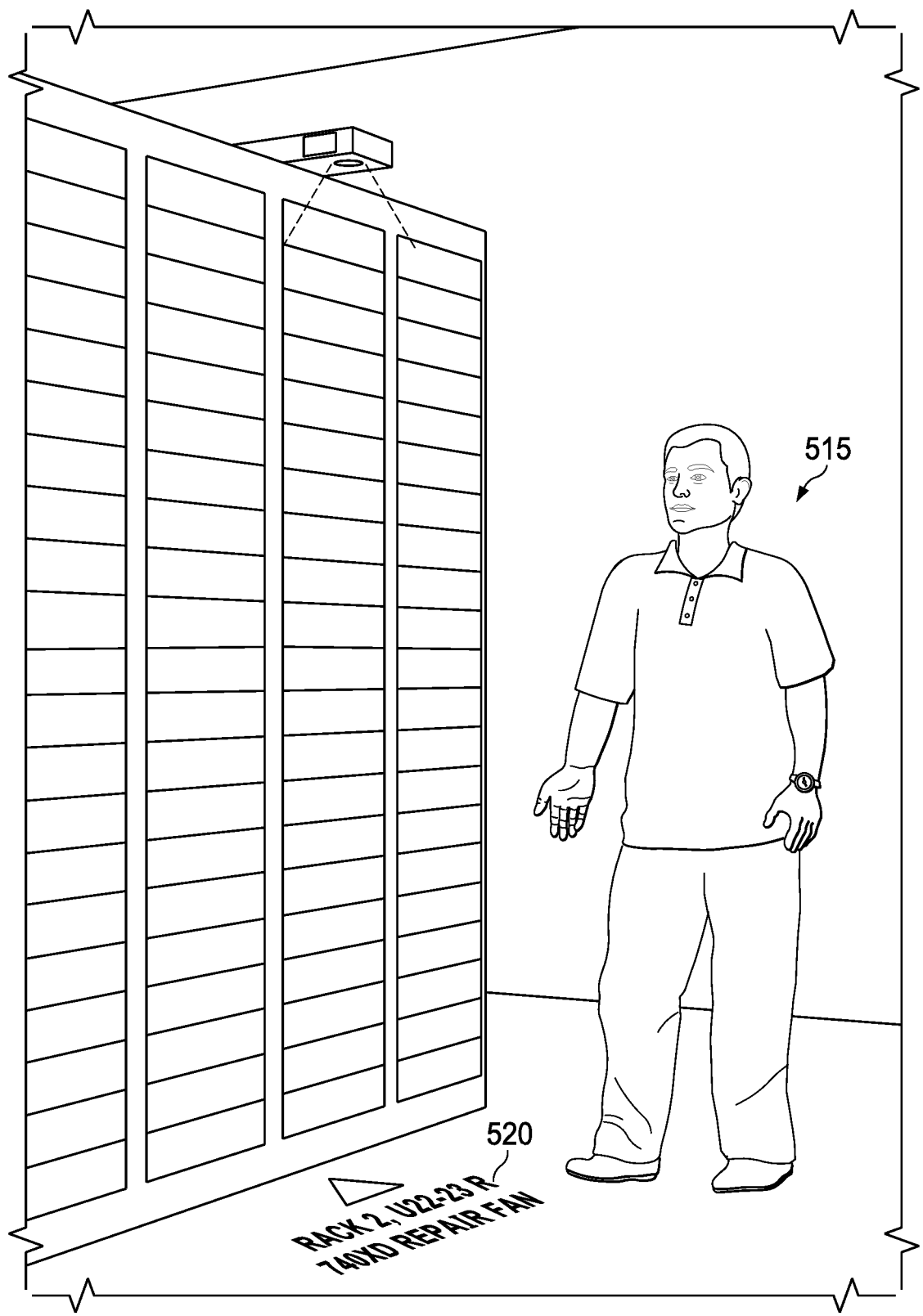
Figure 5C:
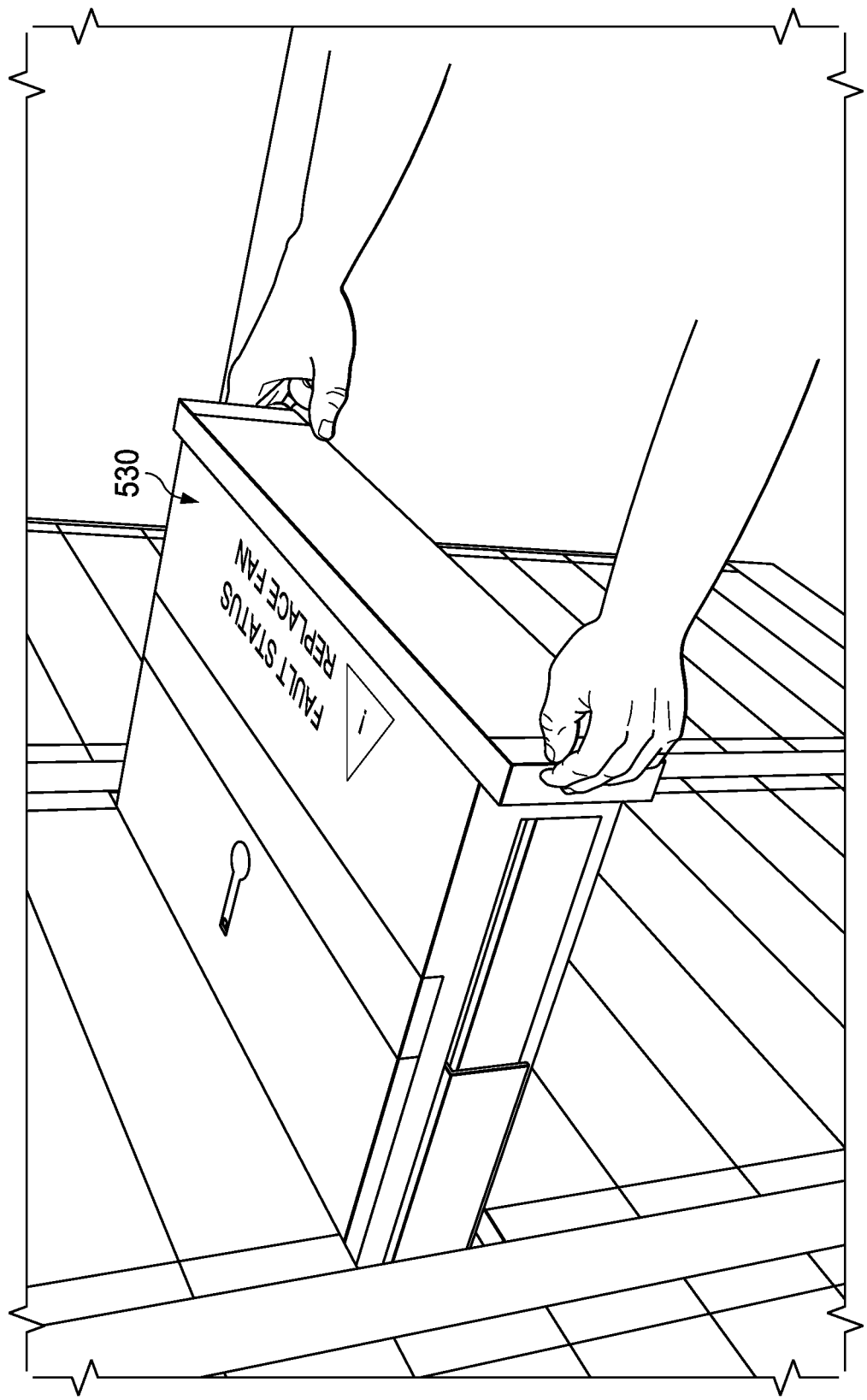

Referring to FIG. 5C, when the IT service personnel 515 accesses the information handling system needing service as indicated by the more detailed message 520, the AR projection system 320 projects an equipment information message 530 onto the information handling system. In various embodiments, the equipment information message 530 can include one or more of a fault status of the information handling system and a service to be performed message.

Figure 5D:
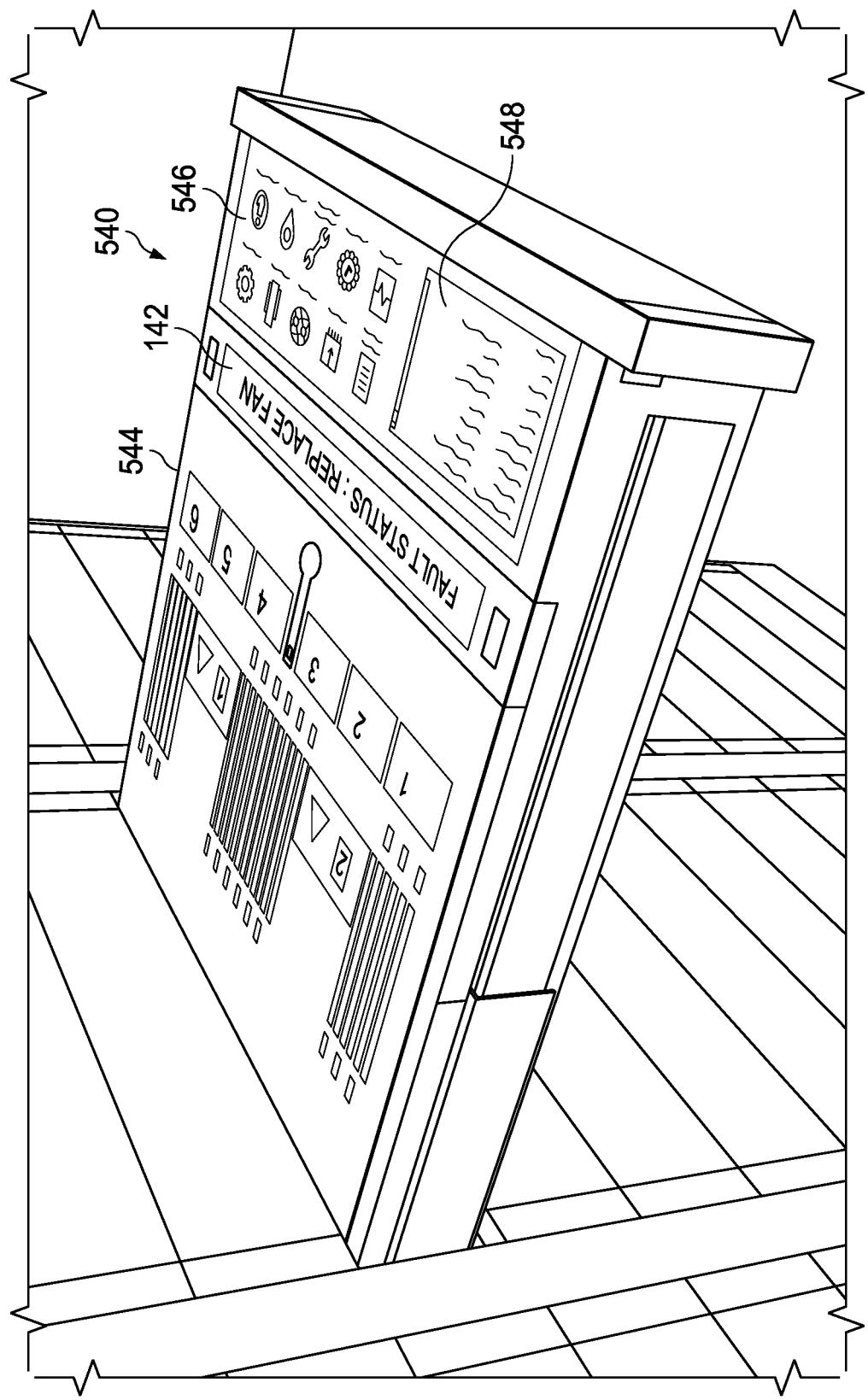

Referring to FIG. 5D, when the information handling system is fully extended along the rails of the rack the AR projection system 320 projects an equipment information message 540 onto the top cover of the information handling system 100. In various embodiments, the equipment information message 540 can include one or more of an instruction banner 542 of the information handling system, a layout of the components contained within the information handling system 544 and instructions regarding what tools and/or components may be needed to perform the service 546 as well as an overview of the steps involved in performing the service 548. In certain embodiments some or all of the message content may be presented as a pictograph (e.g., components are shown as symbols representing the actual components). In certain embodiments, the instruction banner 542 provides instructions, which may be emphasized (e.g., bolded) informing the IT service personnel of a next step to perform.

Figure 5E:
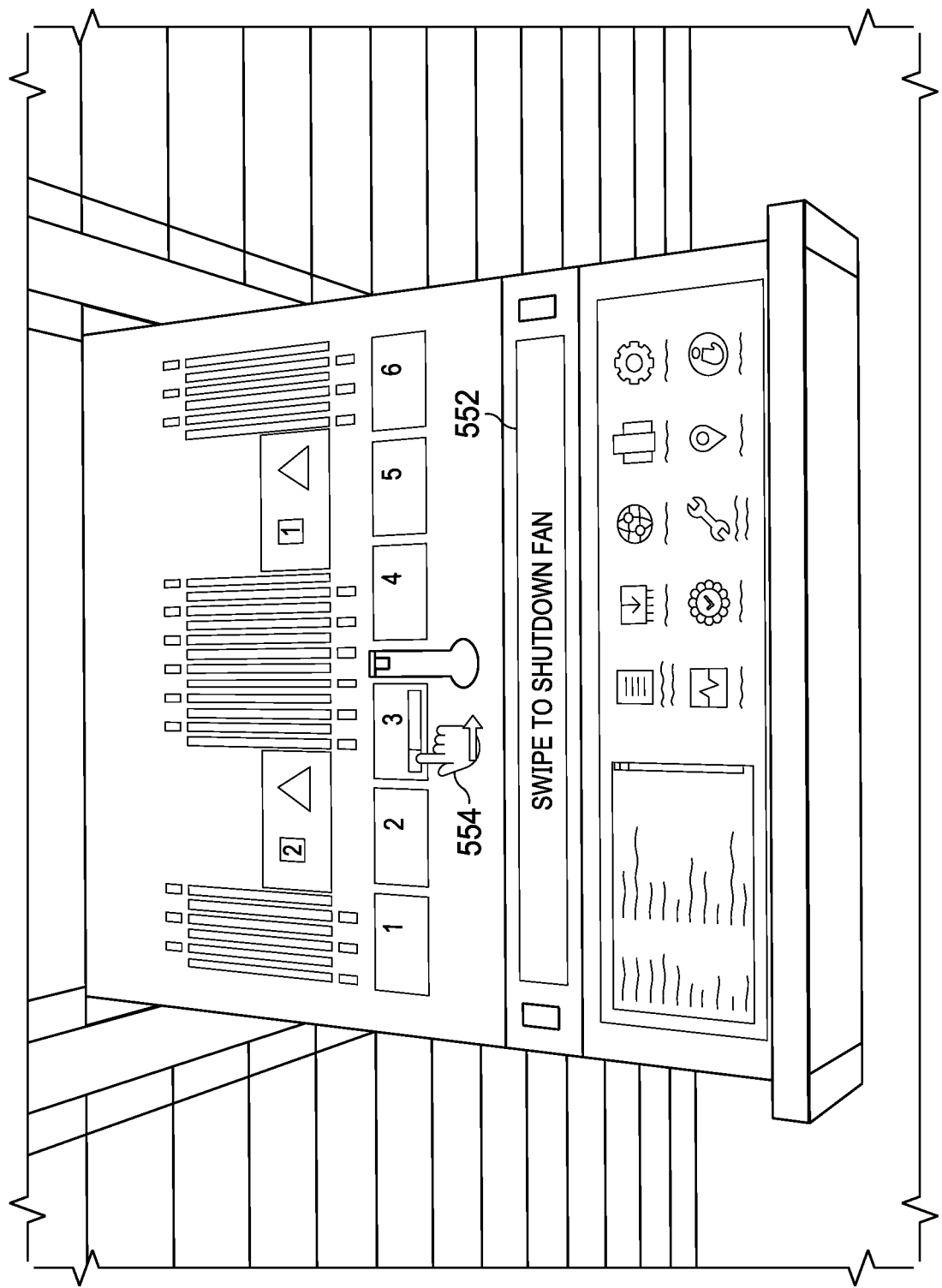
Figure 5F:
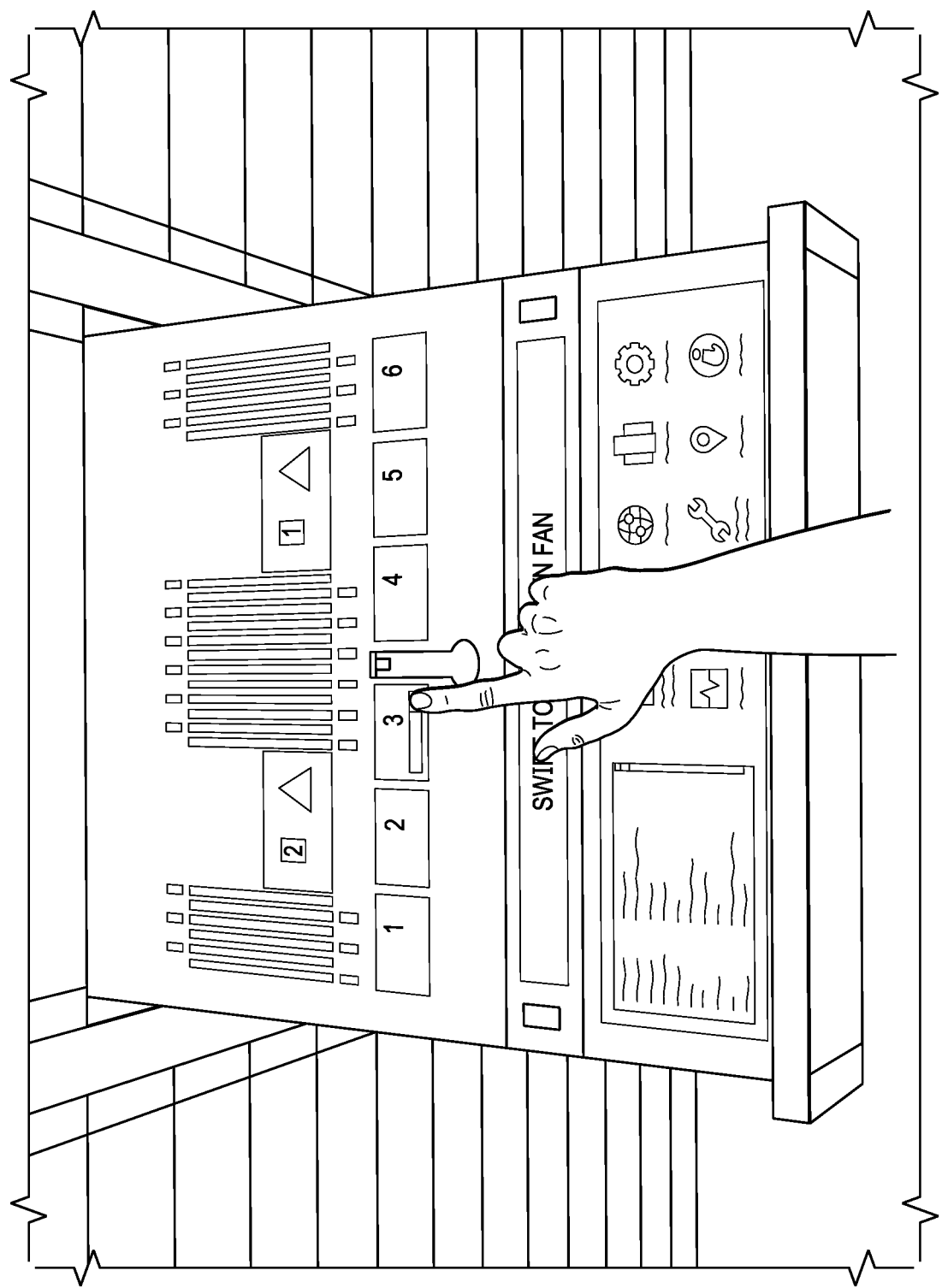

Referring to FIGS. 5E and 5F, in certain embodiments the AR projection system 320 can also detect motion. The AR projection system 320 projects an instruction 552 on the banner to inform the IT service personnel regarding the next step in the service operation. The AR projection system 320 also provides a diagrammatic representation 554 of the action the IT service personnel should take to perform the next step. The motion detection and/or the camera of the AR projection system 320 then detects when the IT service personal performs the indicated action (see e.g., FIG. 5F).

Figure 5G:
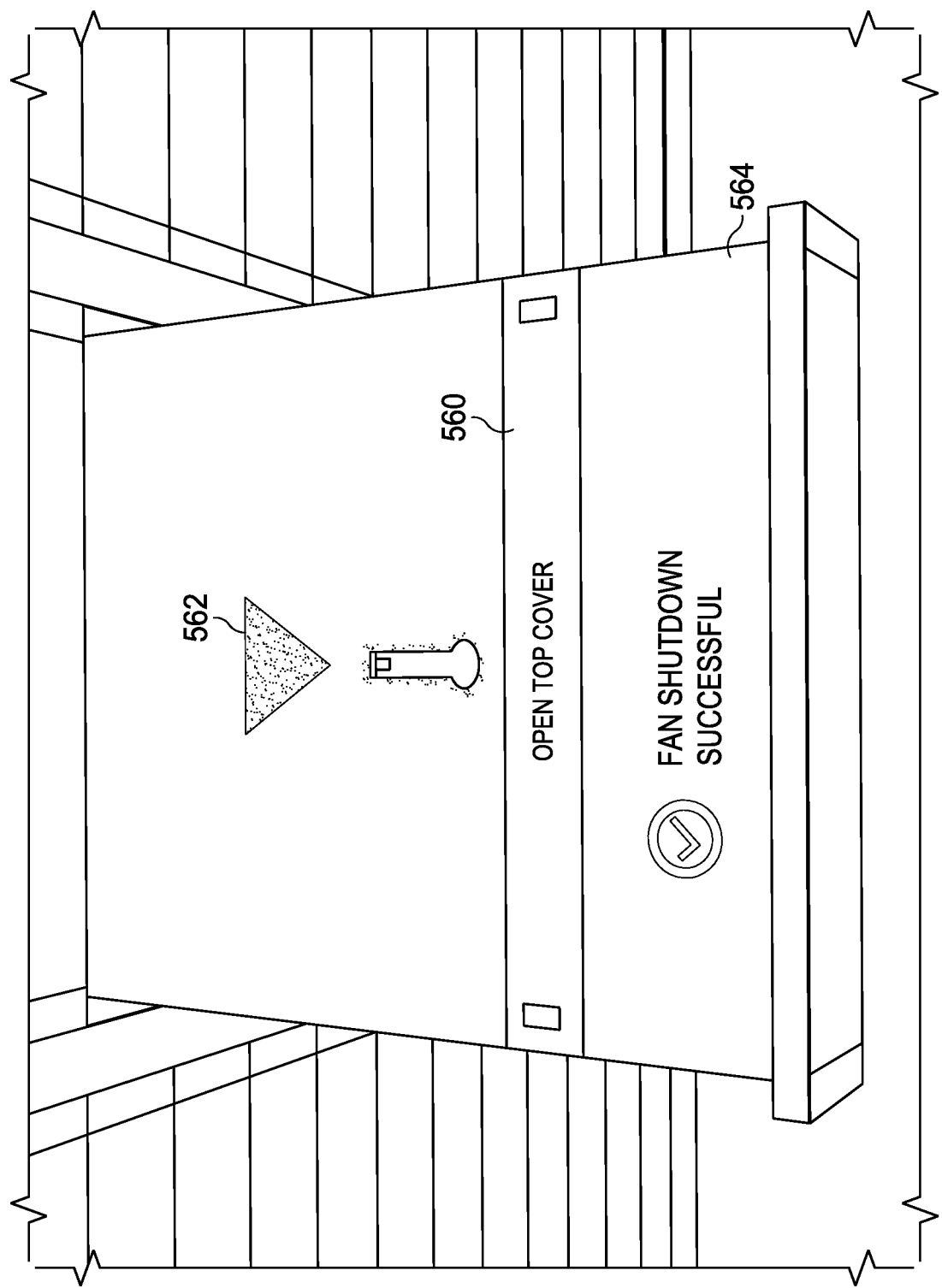

Referring to FIG. 5G, the AR projection system 320 projects an instruction 560 on the banner to inform the IT service personnel regarding the next step in the service operation along with a diagrammatic representation 562 of where this step should be performed (e.g., the latch that needs to be actuated to open the top cover of the information handling system). The AR projection system 320 also projects in informational message 564 indicating completion of the action performed by the IT service personnel.

Figure 5H:
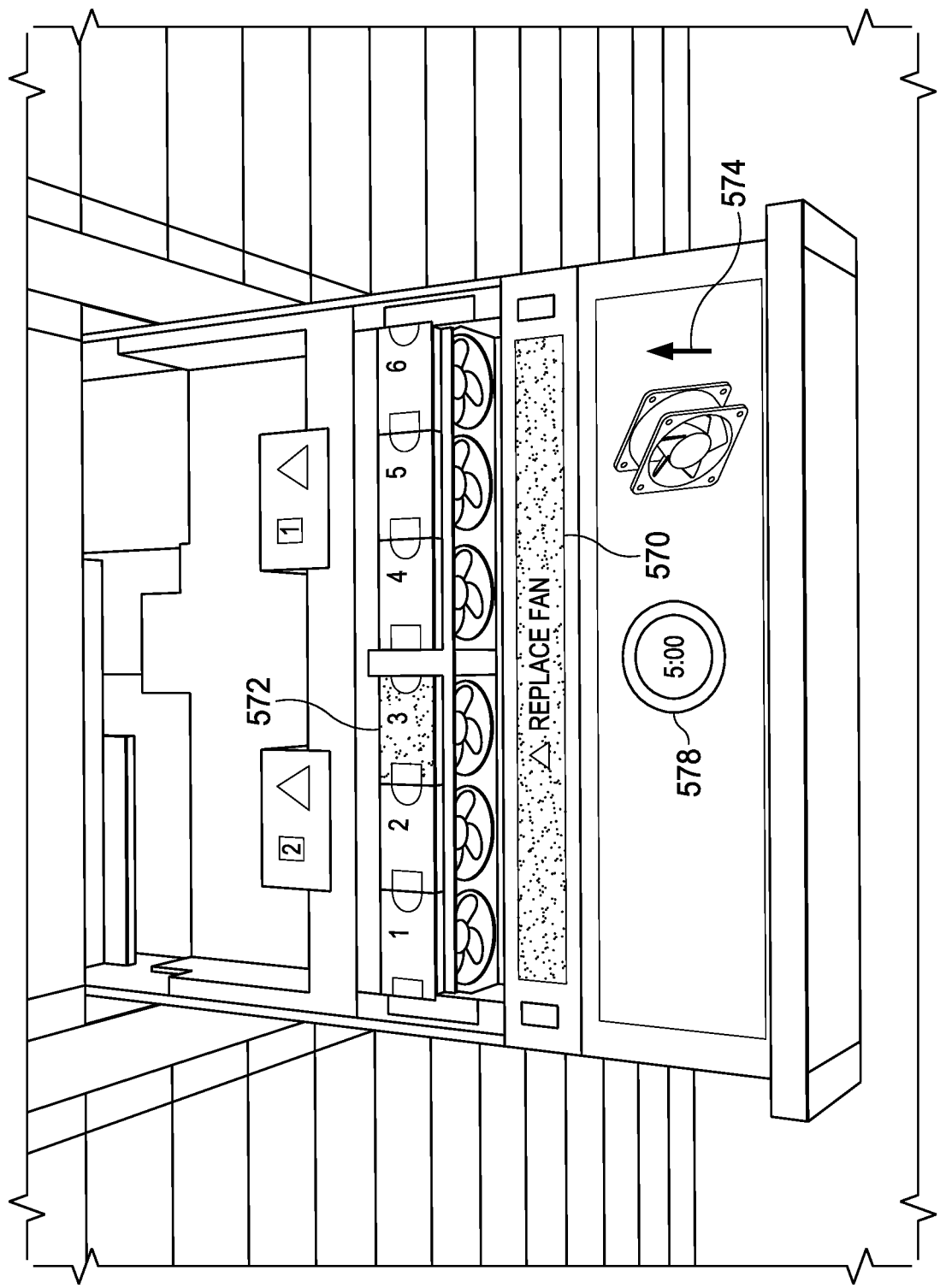
Figure 5I:
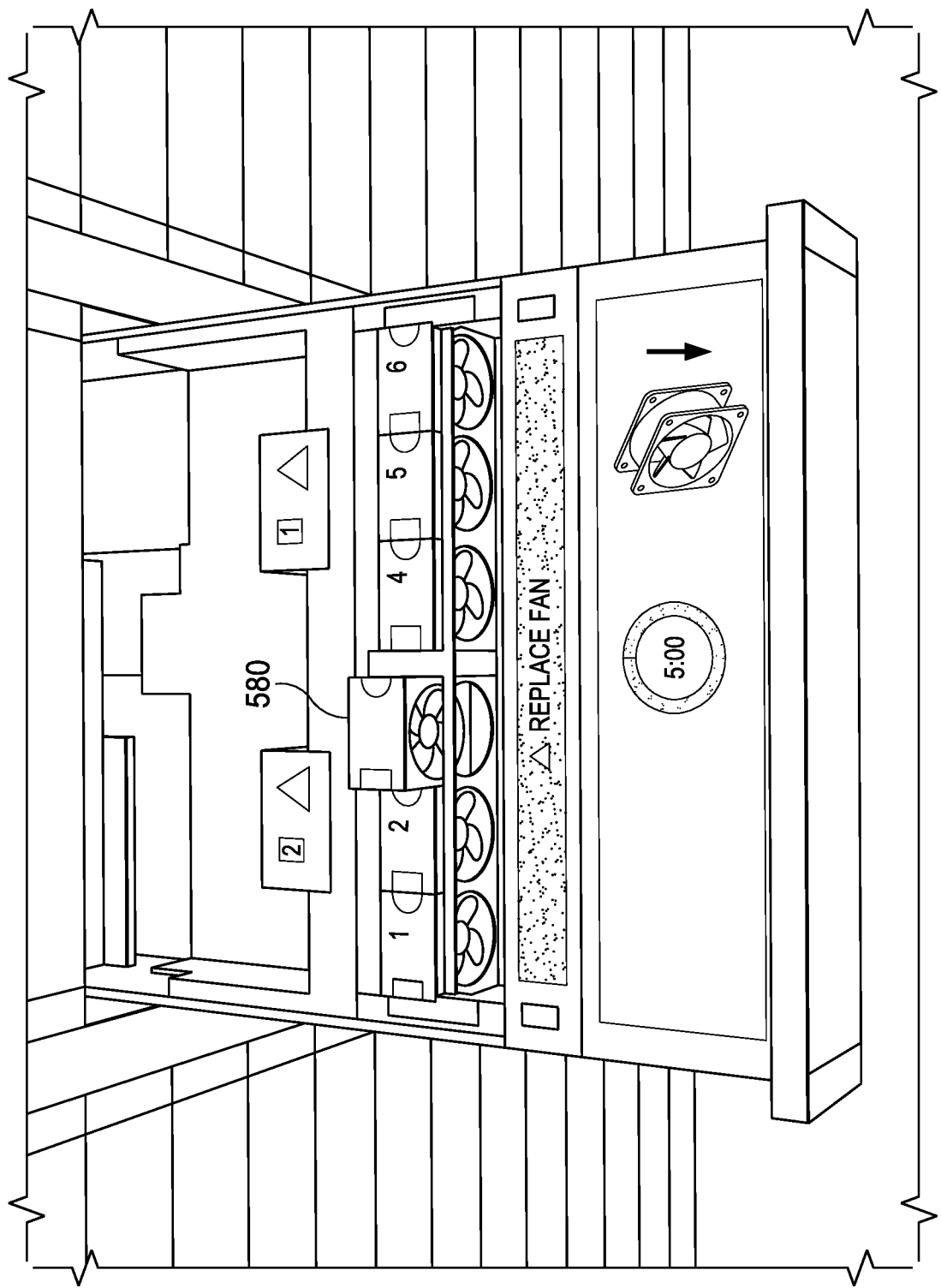
Figure 5J:
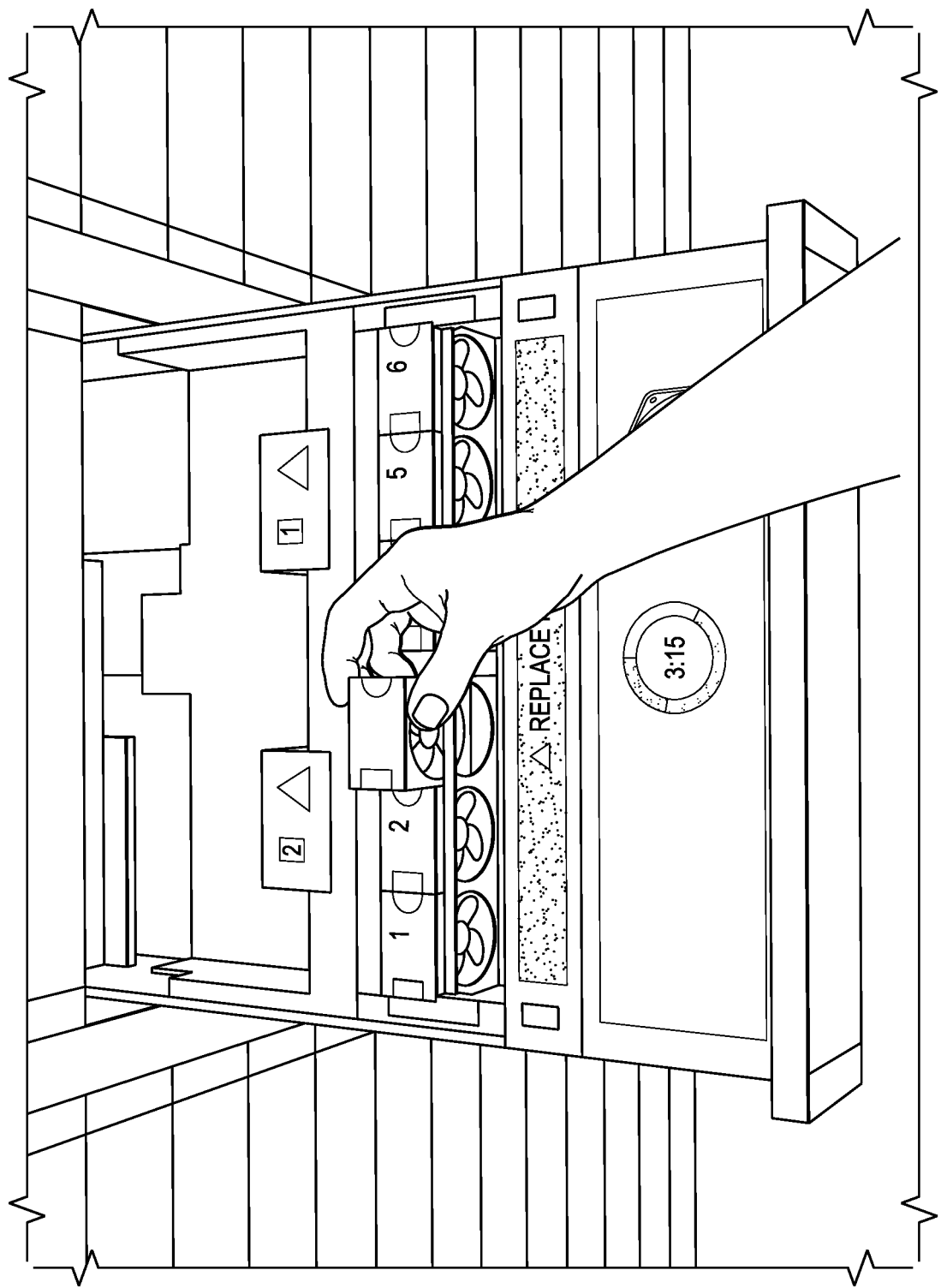

Referring to FIGS. 5H, 5I and 5J, the AR projection system 320 projects an instruction 570 on the banner to inform the IT service personnel regarding the next step in the service operation along with a diagrammatic representation 572 of where this step should be performed (e.g., the fan that needs to be replaced). In various embodiments, the AR projection system 320 projects a representation 576 of the component that needs to be replaced. In certain embodiments, the representation is three dimensional. In various embodiments, the AR projection system 320 projects a timer 578 representing how long it should take to perform the action. Referring to FIG. 5I, the AR projection system 320 projects pictograph type motion content 580 showing the action to be taken (e.g., a pictograph video of the action or removing and replacing the fan). The motion detection and/or camera of the AR projection system 320 then detects when the IT service personal performs the indicated action (see e.g., FIG. 5J).

Figure 5K:
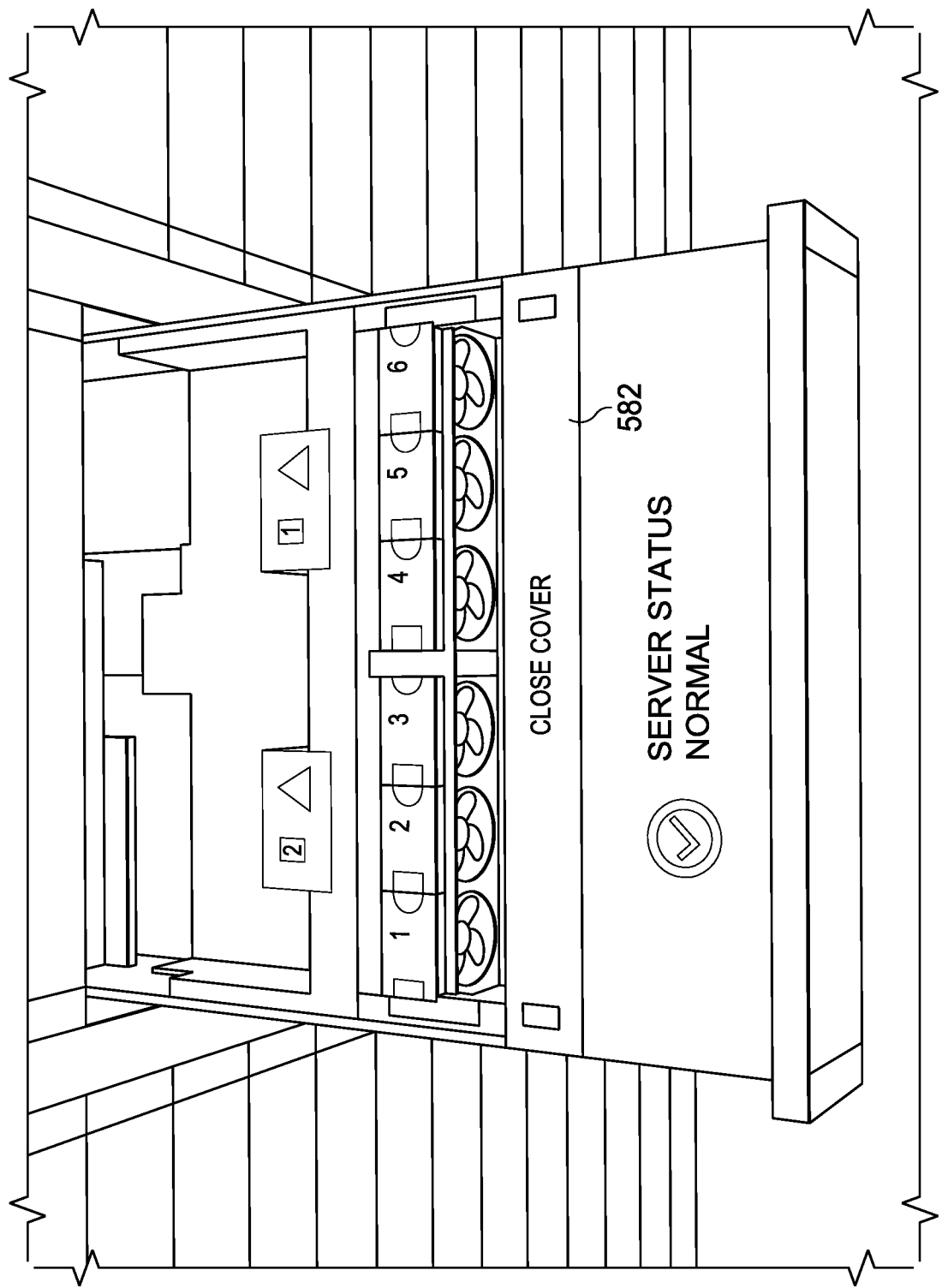

Referring to FIG. 5K, the AR projection system 320 projects an instruction 582 on the banner to inform the IT service personnel regarding the next step in the service operation. The AR projection system 320 also projects in informational message 584 indicating the operational status of the information handling system.

Figure 5L:
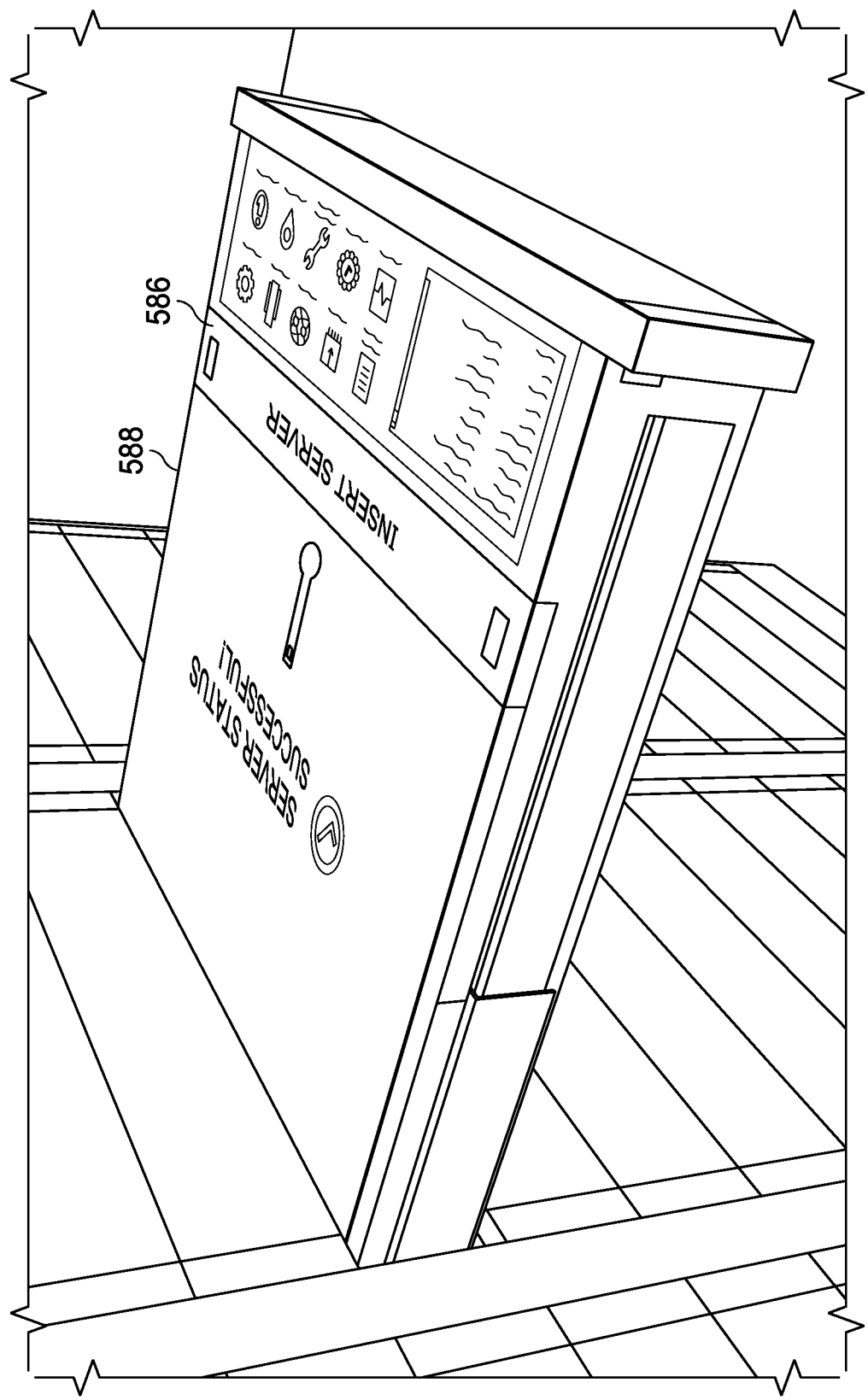

Referring to FIG. 5L, the AR projection system 320 projects an instruction 586 on the banner to inform the IT service personnel regarding the next step in the service operation. The AR projection system 320 also projects in informational message 588 indicating the operational status of the information handling system.

Figure 6:
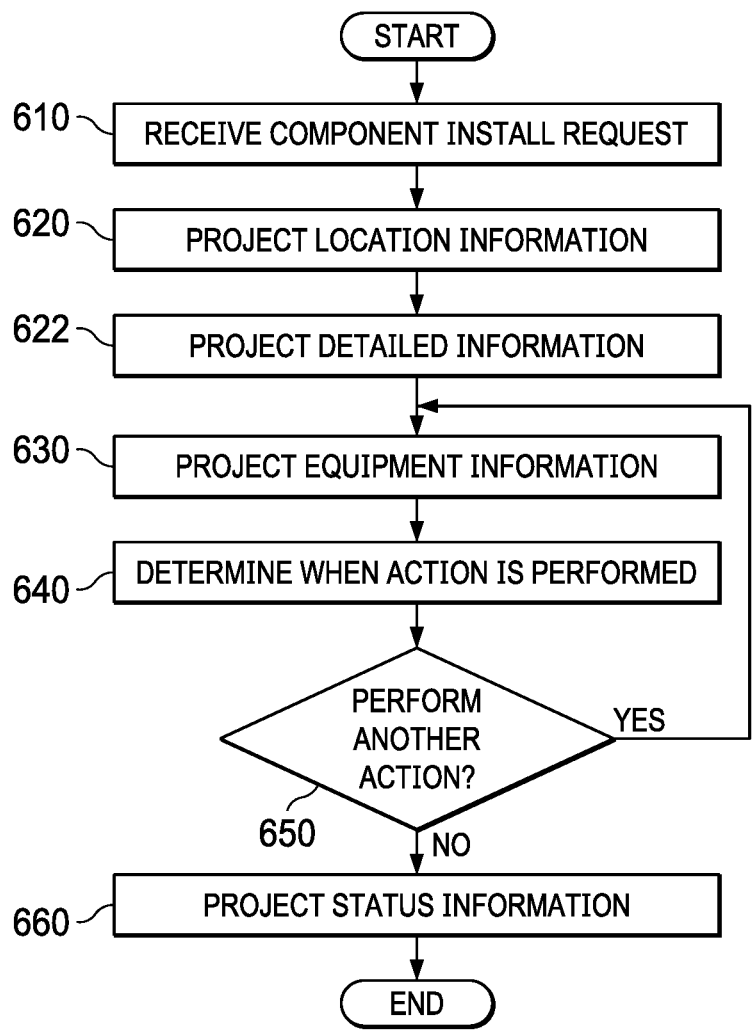
FIG. 6 shows a flow chart of a projected equipment component install operation.

Referring to FIG. 6, a flow chart of a projected equipment component install operation 600 is shown. In various embodiments, the projected equipment component install operation 600 is controlled by the component install system 212.

More specifically, the projected equipment component install operation 600 starts at step 610 by the projected equipment information system 202 receiving an equipment component install request associated with a component install operation to be performed on an information handling system. In various embodiments, the component install operation can include repair or replacement of a component within an information handling system 100. In certain embodiments, the equipment component install request may be generated by the system management system 226. Next at step 620 the projected equipment information system 202 then causes the AR projection system 320 to project location information within the IT environment to indicate to an IT service personnel a location of the information handling system associated with the equipment component install request. Next at step 622 upon detection of the IT service personnel being proximate to the location of the information handling system associated with the equipment component install request the projected equipment system 200 causes the AR projection system 320 to project a more detailed message.

Next, at step 630, when the IT service personnel accesses the information handling system associated with the component install request, the projected equipment information system 202 causes the AR projection system 320 to project an equipment information message onto the information handling system associated with the component install request. In various embodiments, the equipment information message includes an action message which indicates an action to be performed by the IT service personnel. Next at step 540, the projected equipment information system 202 determines when the action is performed by the IT service personnel. In various embodiments, the determination may be made by information provided by a camera or motion sensor within the AR projection system 230, by information generated by the system management system 226 or a combination thereof.

Once it is determined that the action has been performed, the projected equipment information system 202 determines whether another action needs to be performed. If so, then the projected equipment information system 202 causes another equipment information message to be projected onto the information handling system. If not, then the projected equipment information system 202 causes the AR projection system 320 to project a status message onto the information handling system at step 560 and the projected equipment component install operation 600 completes operation.

FIGS. 7A-7J show an example projected equipment component install operation. More specifically, referring to FIG. 7A, the projected equipment component install operation begins with the AR projection system 320 projecting a bold information message 710 onto the floor in front of a rack that contains an information handling system for which a component is to be installed. The bold information message 710 provides an indication of where the system for which the component is to be installed is located within the IT environment. The AR content is visible in any lighting conditions with graphics that facilitate discoverability of a system needing the component installed. The AR content includes legible service information.

In certain embodiments the AR content can alter depending on IT service personnel proximity, detected by motion detection sensors. For example, a one distance (e.g., a distance of over 10 feet), a bold warning message (e.g., message 710) is projected to attract the attention of the IT service personnel 715. At another distance (e.g., a distance of less than 10 feet), a more detailed message is projected to provide more information regarding one or more of the equipment status, the issue and component to be installed by the IT service personnel 715.

Figure 7A:
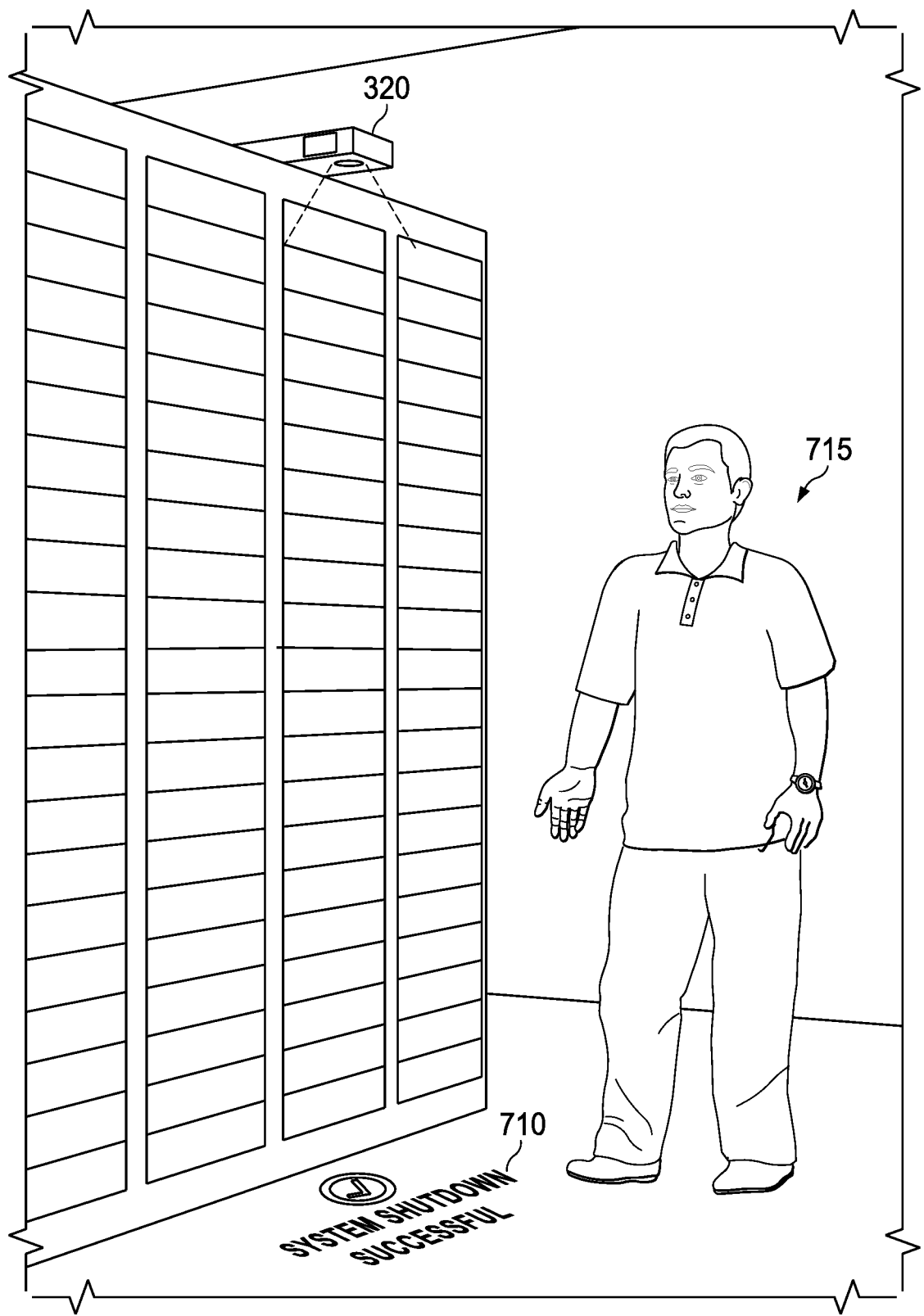
FIGS. 7A-7J show an example projected equipment component install operation.
Figure 7B:
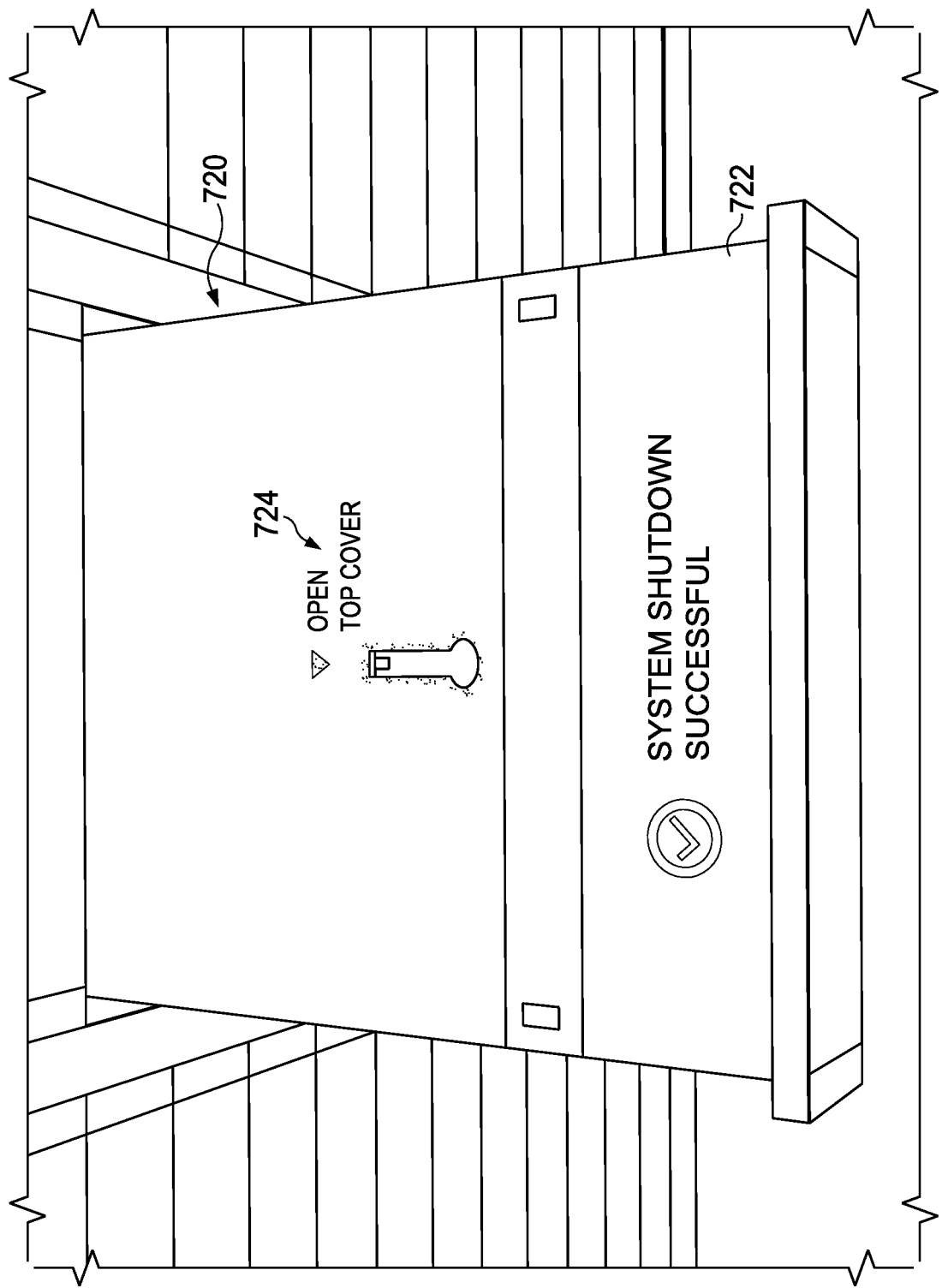

Referring to FIG. 7B, when the IT service personnel 715 accesses the information handling system for which the component is to be installed, the AR projection system 320 projects an equipment information message 720 onto the information handling system. In various embodiments, the equipment information message 720 can include one or more of a status of the information handling system 722 and an operation to be performed message 724.

Figure 7C:
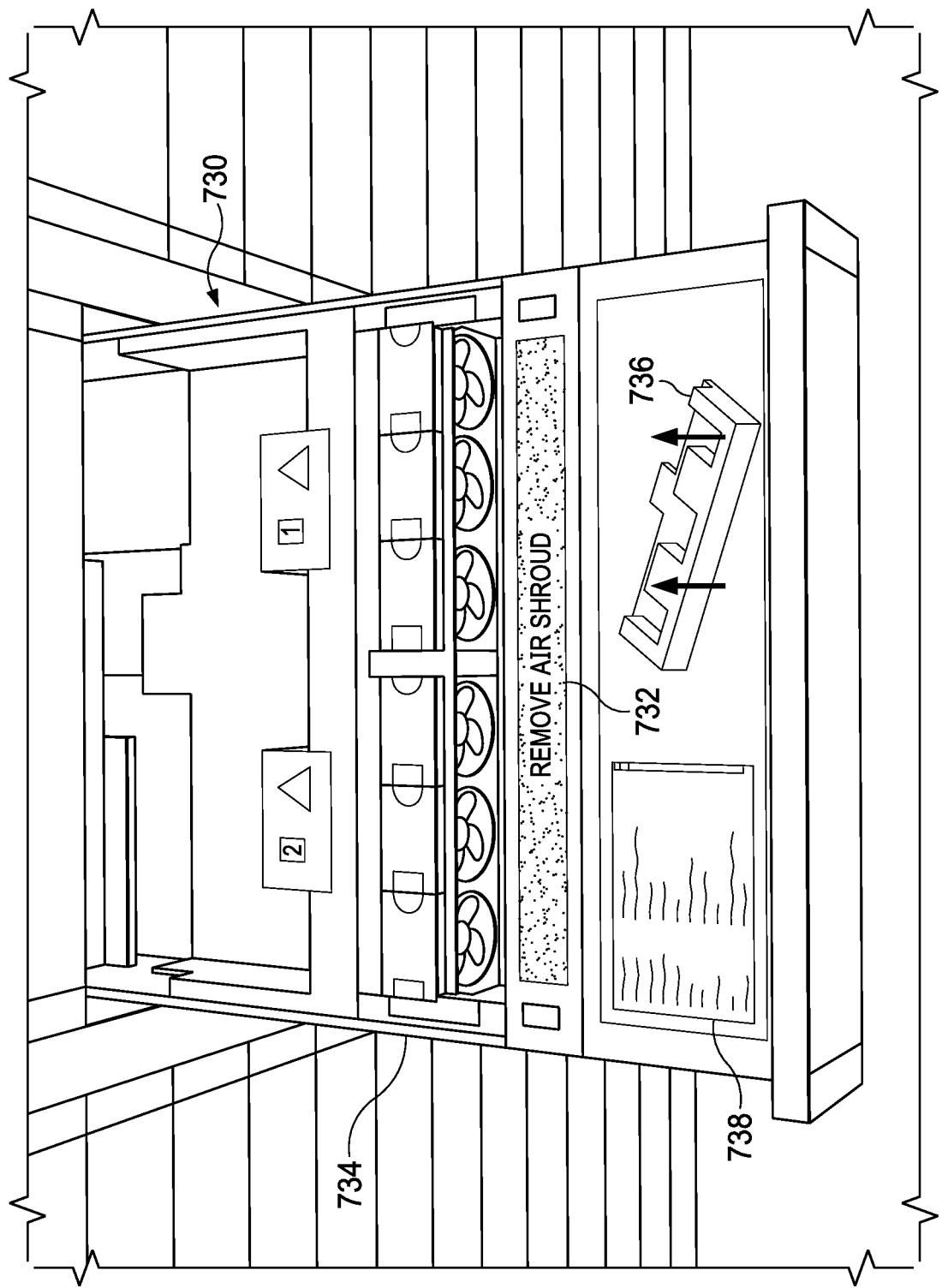
Figure 7D:
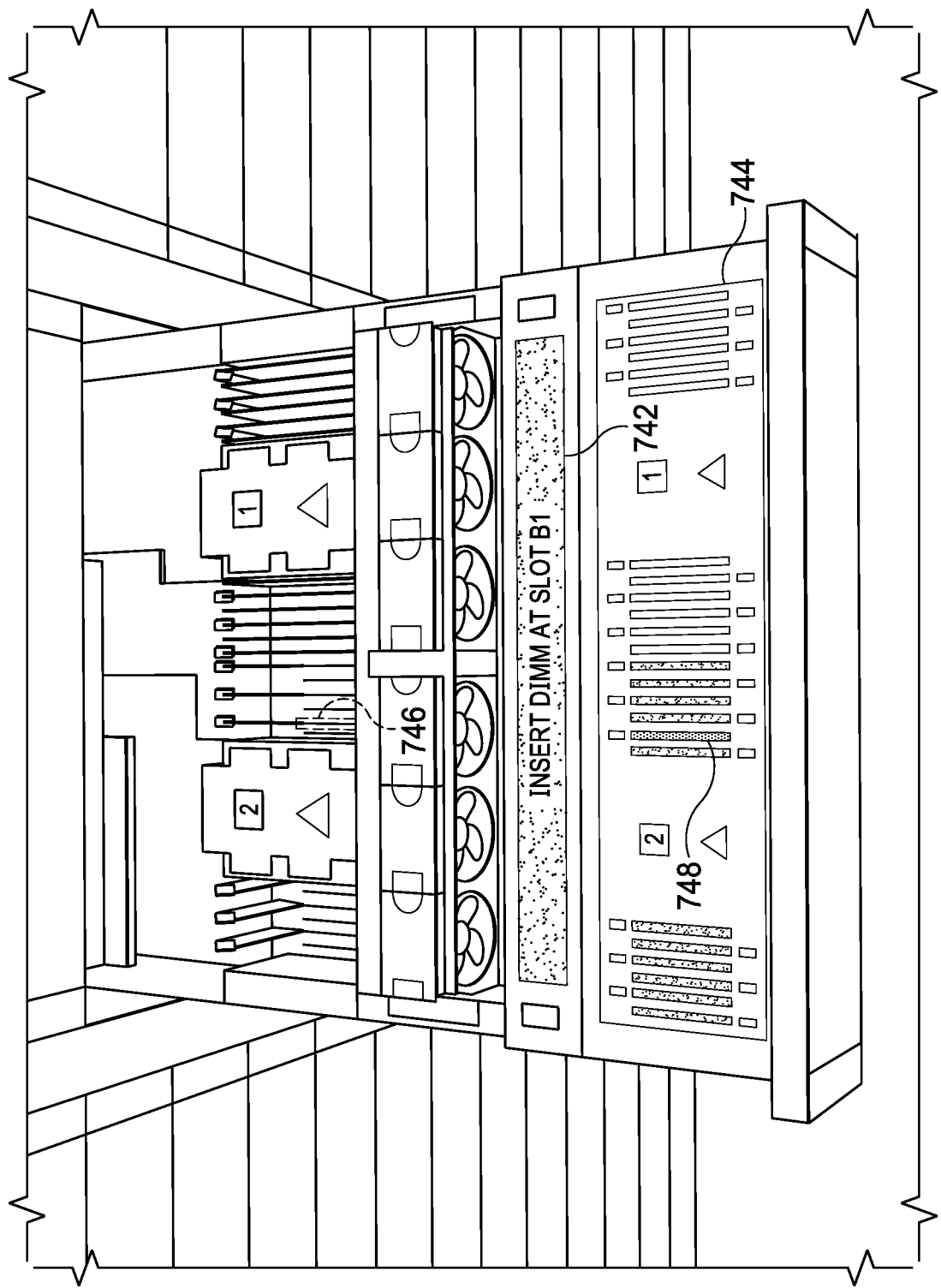
Figure 7E:
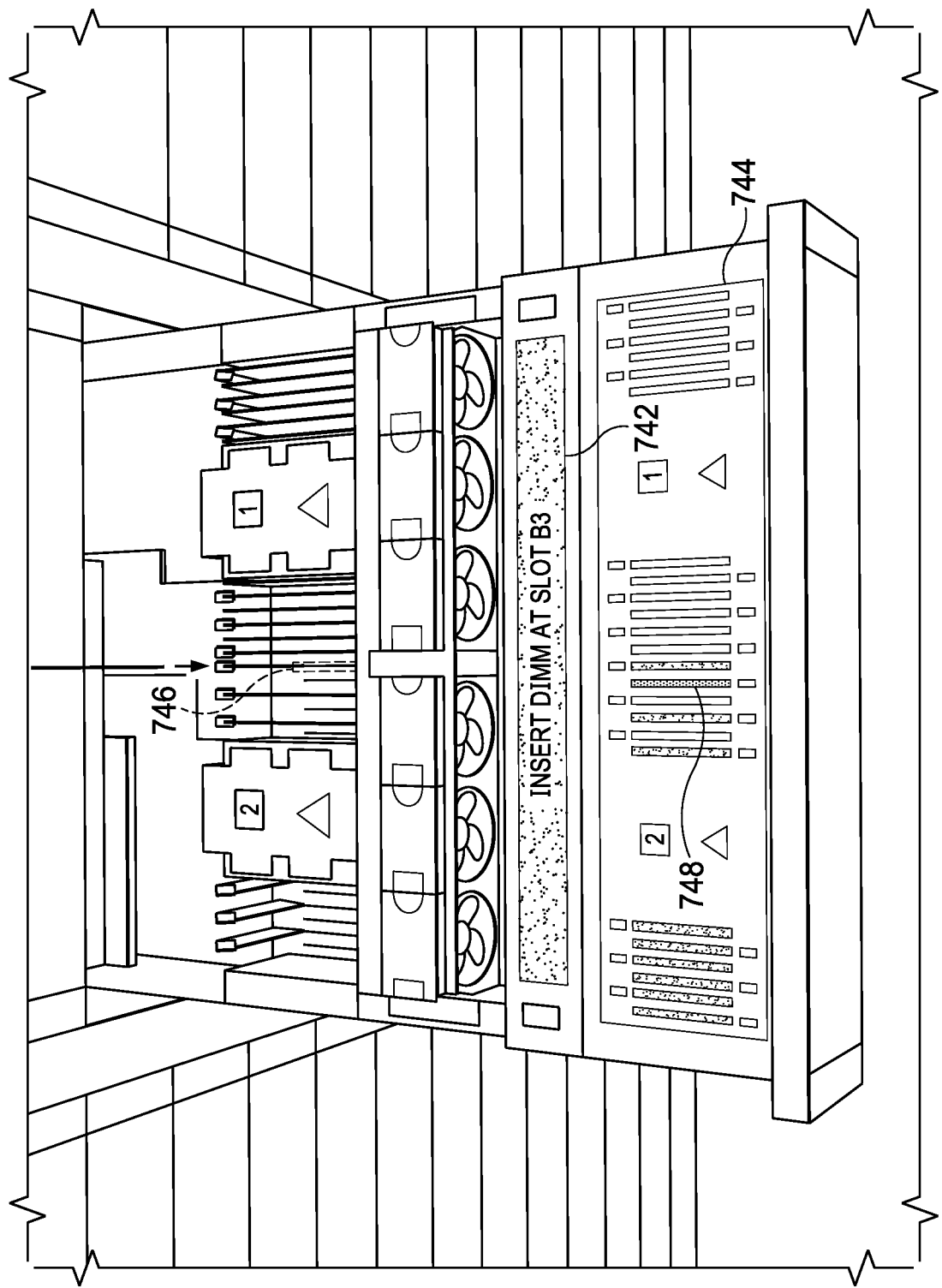
Figure 7F:
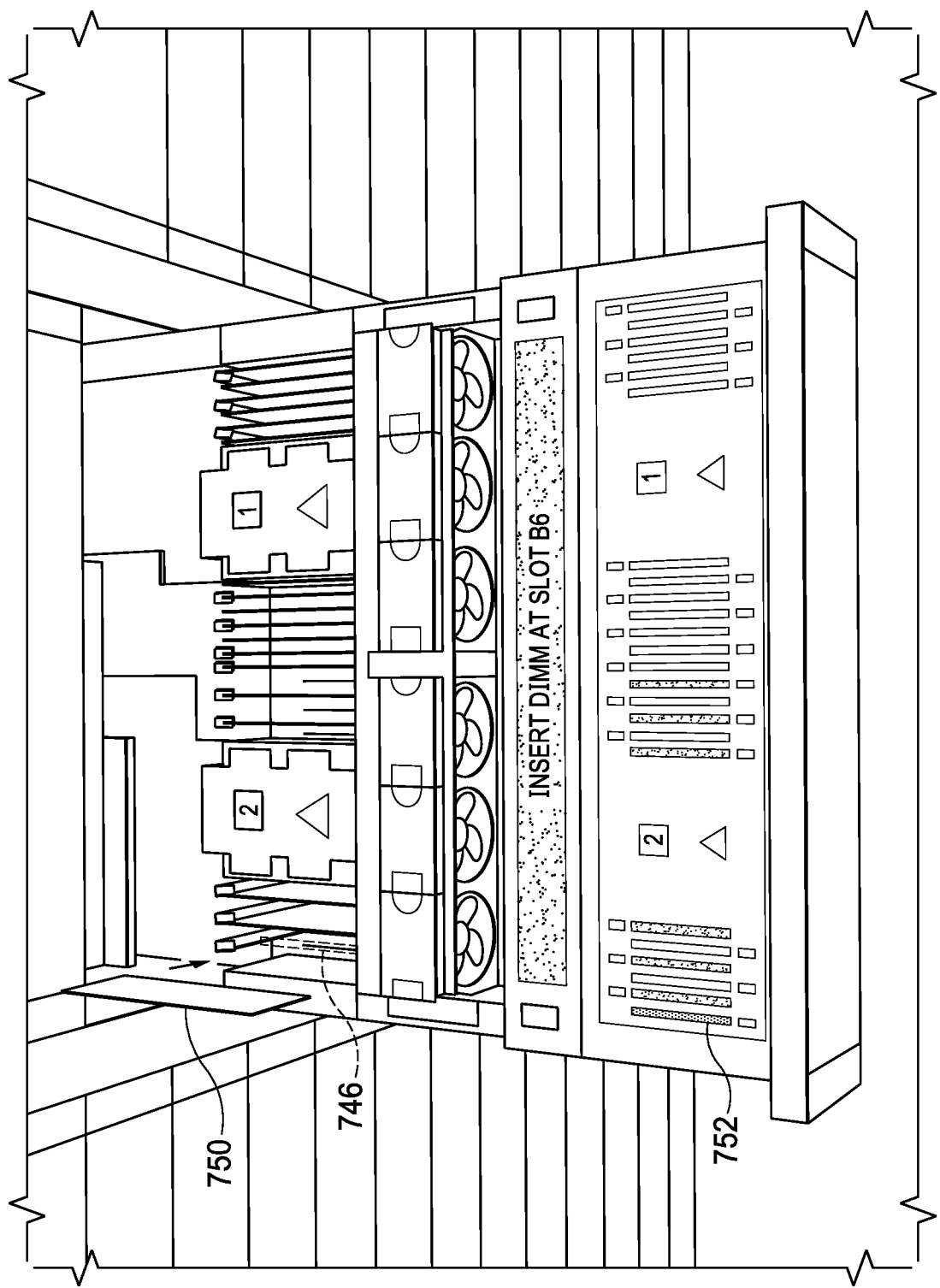
Figure 7G:
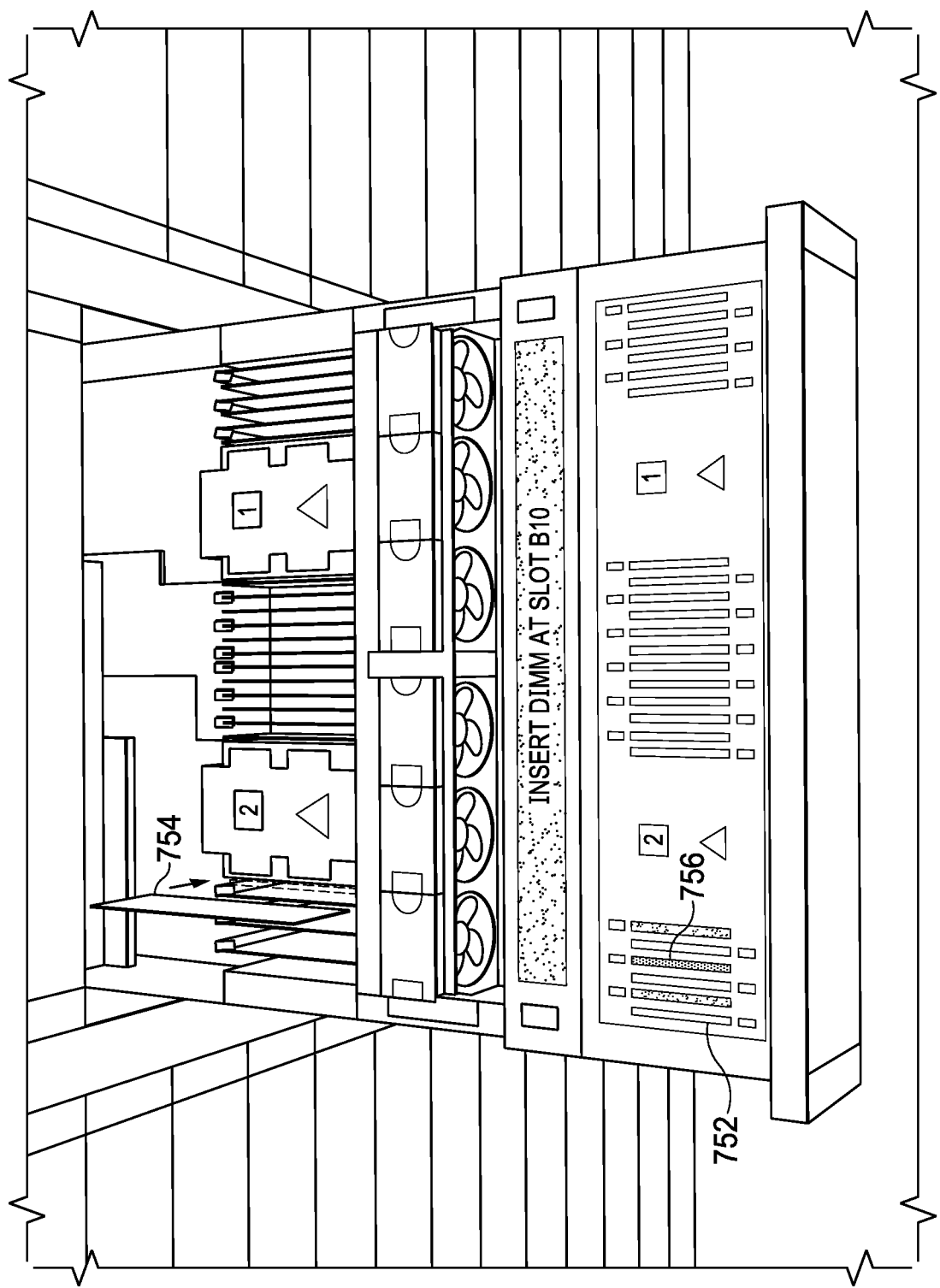
Figure 7H:
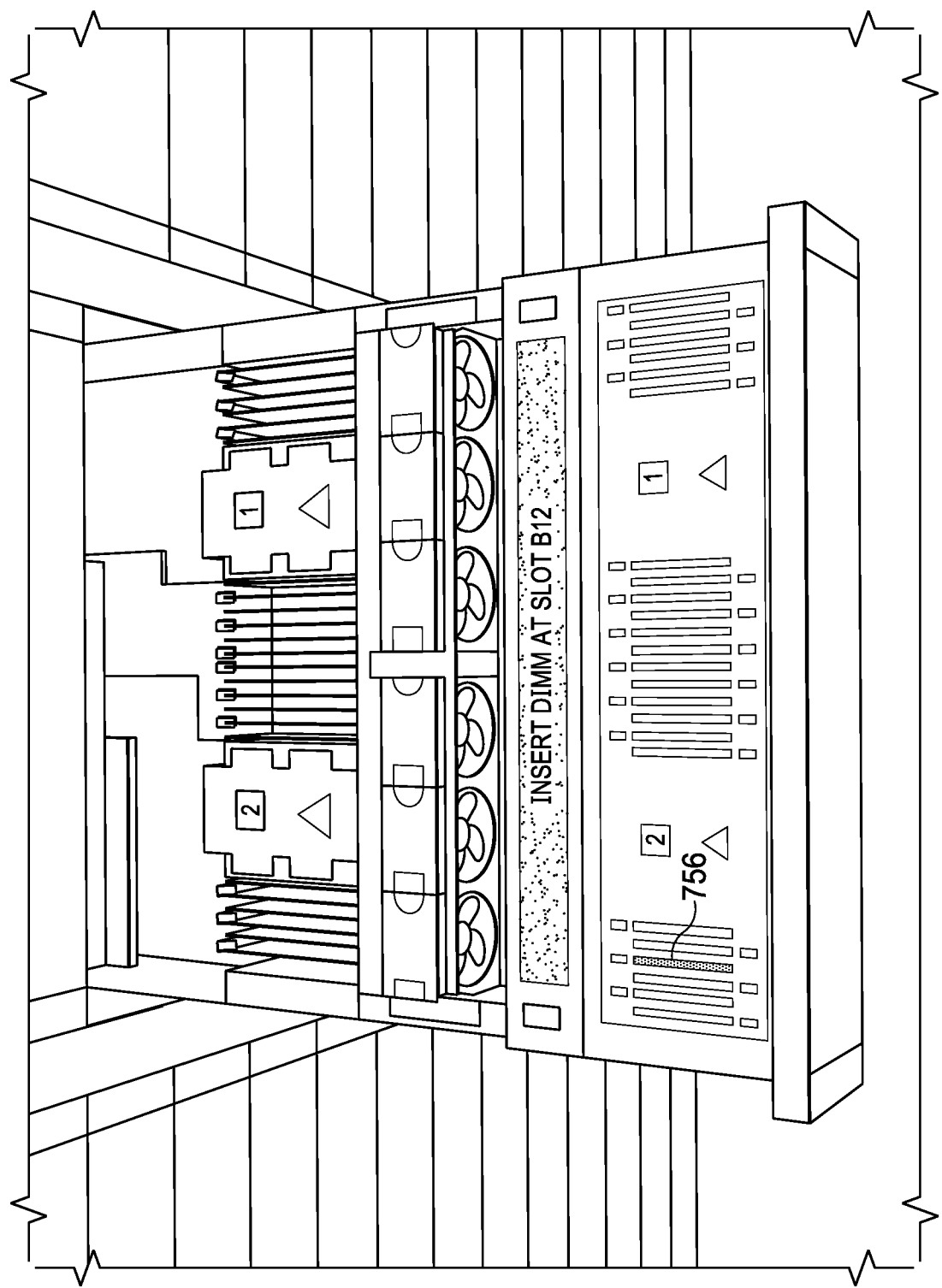

Referring to FIG. 7C, when the information handling system is fully extended along the rails of the rack the AR projection system 320 projects an equipment information message 730 onto the top cover of the information handling system 100. In various embodiments, the equipment information message 730 can include one or more of an instruction banner 732 of the information handling system, a layout of the components contained within the information handling system 734 and instructions regarding what tools and/or components may be needed to perform the component install 736 as well as an overview of the steps involved in performing the service 738. In certain embodiments some or all of the message content may be presented as a pictograph (e.g., components are shown as symbols representing the actual components). In certain embodiments, the instruction banner 732 provides instructions, which may be emphasized (e.g., bolded) informing the IT service personnel of a next step to perform.

Referring to FIGS. 7D, 7E, 7F, 7G and 7H, the AR projections for a series of component install operations are shown. Additionally, in certain embodiments the AR projection system 320 can also detect motion.

The AR projection system 320 projects an instruction 742 on the banner to inform the IT service personnel regarding the next step in the service operation (e.g., Insert DIMM at Slot B1). The AR projection system 320 also provides a diagrammatic representation 744 of the action the IT service personnel should take to perform the next step. The AR projection system 320 also projects an indication 746 onto the physical location where the action is to be performed. In certain embodiments, the diagrammatic representation 744 also includes a representation 748 of the location where the action is to be performed. In certain embodiments, the motion detection and/or the camera of the AR projection system 320 detects when the IT service personal performs the indicated action before projection of the next action to be performed (e.g., the action of installing the component 750 into the indicated slot). As the component install actions are preformed, the diagrammatic representation 744 includes a updated representation of the installed components (see e.g., 744 of FIGS. 7F-7H). For example, after the component 750 is installed to the indicated location, the representation 752 at the location of the installed component changes to indicate the action was performed. After the component 754 is installed to the indicated location, the representation 756 at the location of the installed component changes to indicate the action was performed.

Figure 7I:
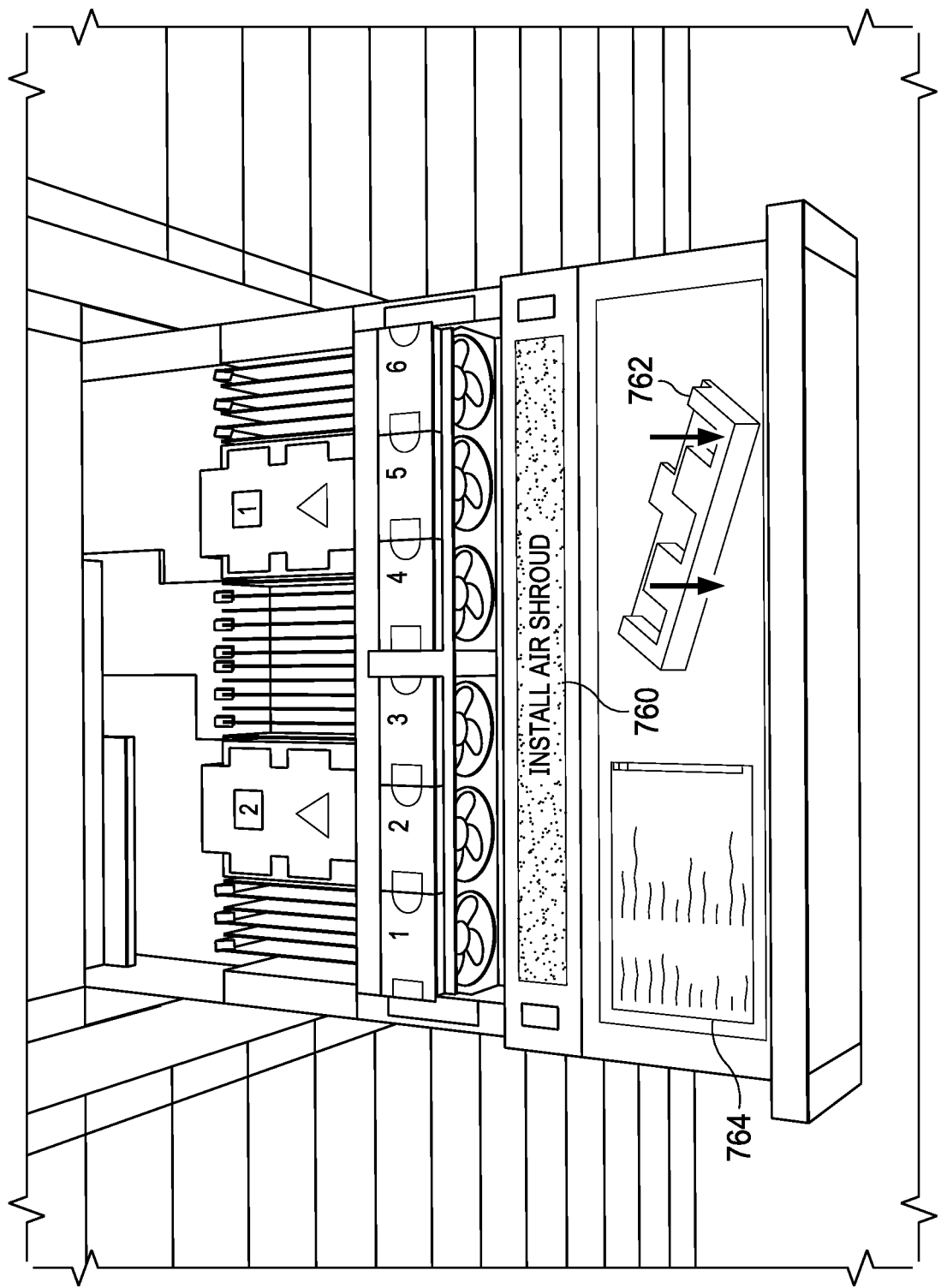

Referring to FIG. 7I, the AR projection system 320 projects an instruction 760 on the banner to inform the IT service personnel regarding the next step in the component install operation along with a diagrammatic representation 762 of where this step should be performed (e.g., install the air shroud). The AR projection system 320 also projects in informational message 764 indicating completion of the action performed by the IT service personnel.

Figure 7J:
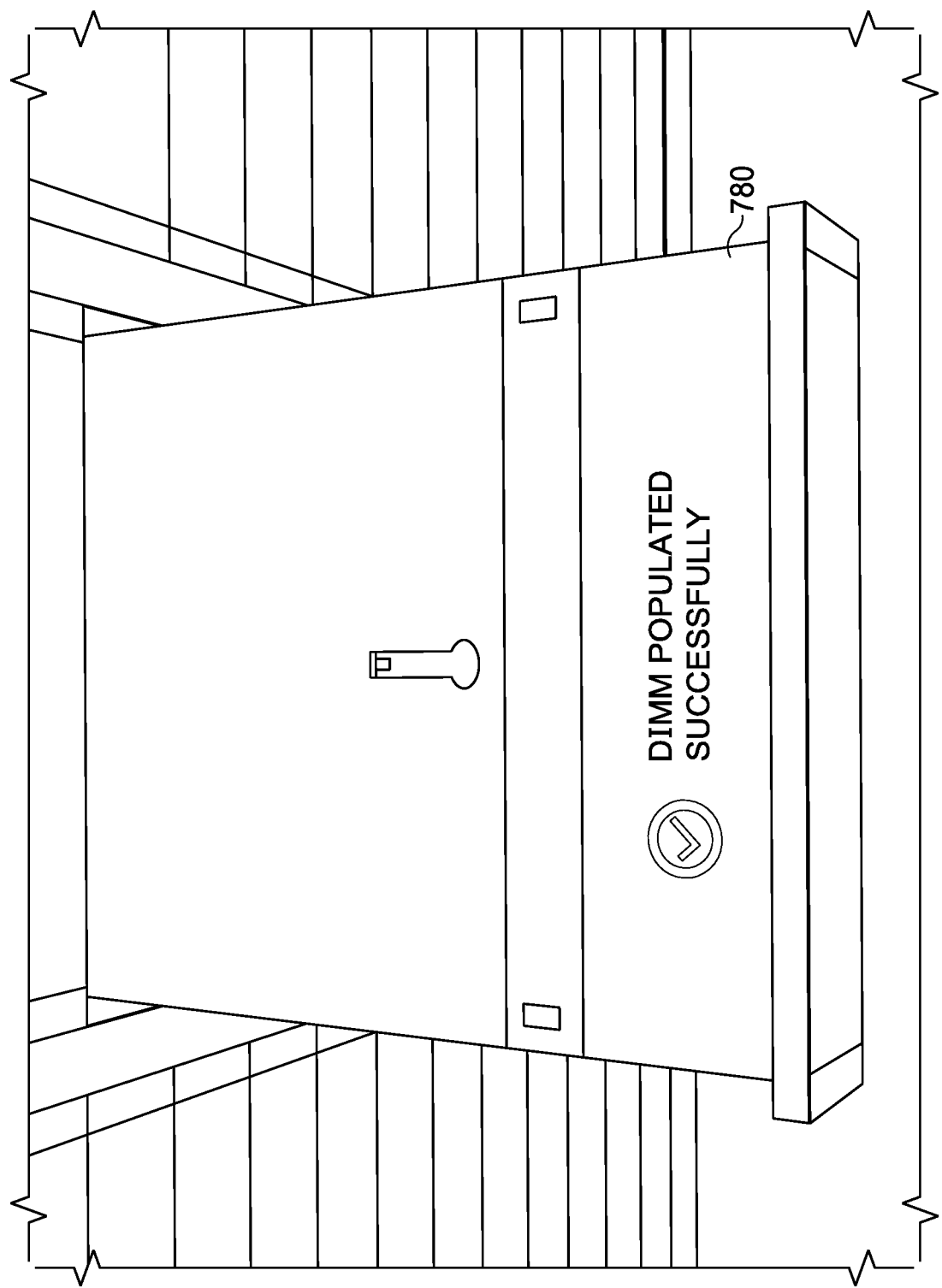

Referring to FIG. 7J, the AR projection system 320 projects an informational message 780 indicating the status of the component install operation.

Figure 8:
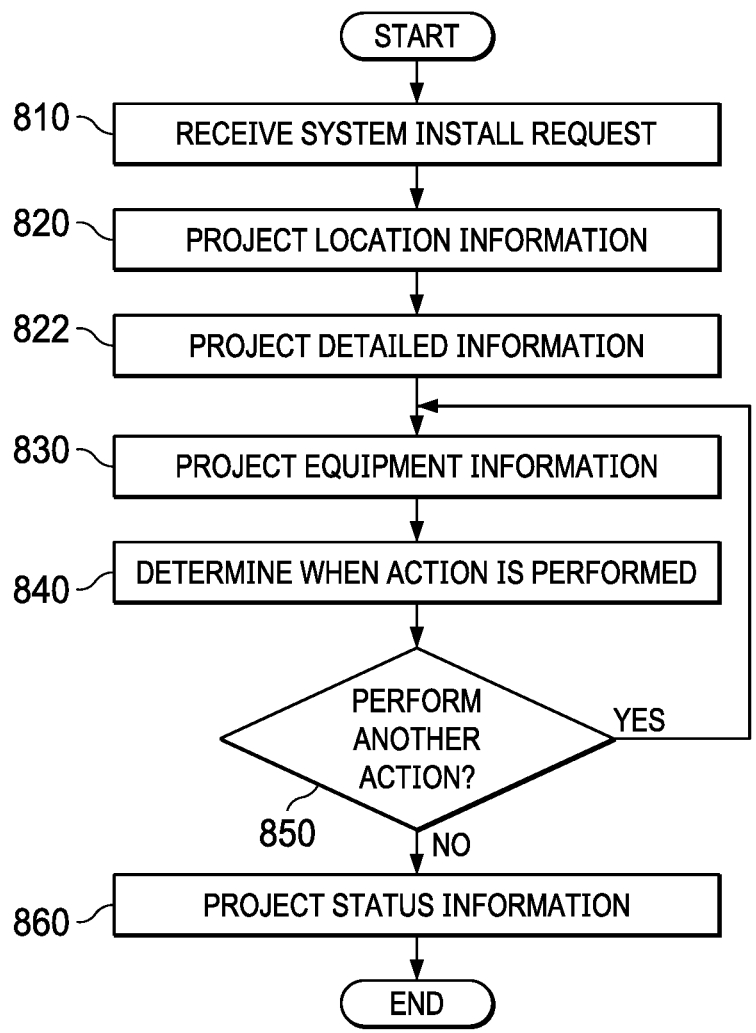
FIG. 8 shows a flow chart of a projected equipment system install operation.

FIG. 8 shows a flow chart of a projected equipment system install operation.

Referring to FIG. 8, a flow chart of a projected equipment system install operation 800 is shown. In various embodiments, the projected equipment system install operation 800 is controlled by the system install system 214.

More specifically, the projected equipment system install operation 800 starts at step 810 by the projected equipment information system 202 receiving an equipment system install request associated with a system install operation to be performed on an information handling system. In various embodiments, the system install operation can include installation, repair or replacement of a system within an information handling system 100. In certain embodiments, the equipment system install request may be generated by the system management system 226. Next at step 820 the projected equipment information system 202 then causes the AR projection system 320 to project location information within the IT environment to indicate to an IT service personnel a location of the information handling system associated with the equipment system install request. Next at step 822 upon detection of the IT service personnel being proximate to the location of the information handling system associated with the equipment system install request the projected equipment system 200 causes the AR projection system 320 to project a more detailed message.

Next, at step 830, when the IT service personnel accesses the information handling system associated with the system install request, the projected equipment information system 202 causes the AR projection system 320 to project an equipment information message onto the information handling system associated with the system install request. In various embodiments, the equipment information message includes an action message which indicates an action to be performed by the IT service personnel. Next at step 540, the projected equipment information system 202 determines when the action is performed by the IT service personnel. In various embodiments, the determination may be made by information provided by a camera or motion sensor within the AR projection system 230, by information generated by the system management system 226 or a combination thereof.

Once it is determined that the action has been performed, the projected equipment information system 202 determines whether another action needs to be performed. If so, then the projected equipment information system 202 causes another equipment information message to be projected onto the information handling system. If not, then the projected equipment information system 202 causes the AR projection system 320 to project a status message onto the information handling system at step 560 and the projected equipment system install operation 800 completes operation.

Figure 9A:
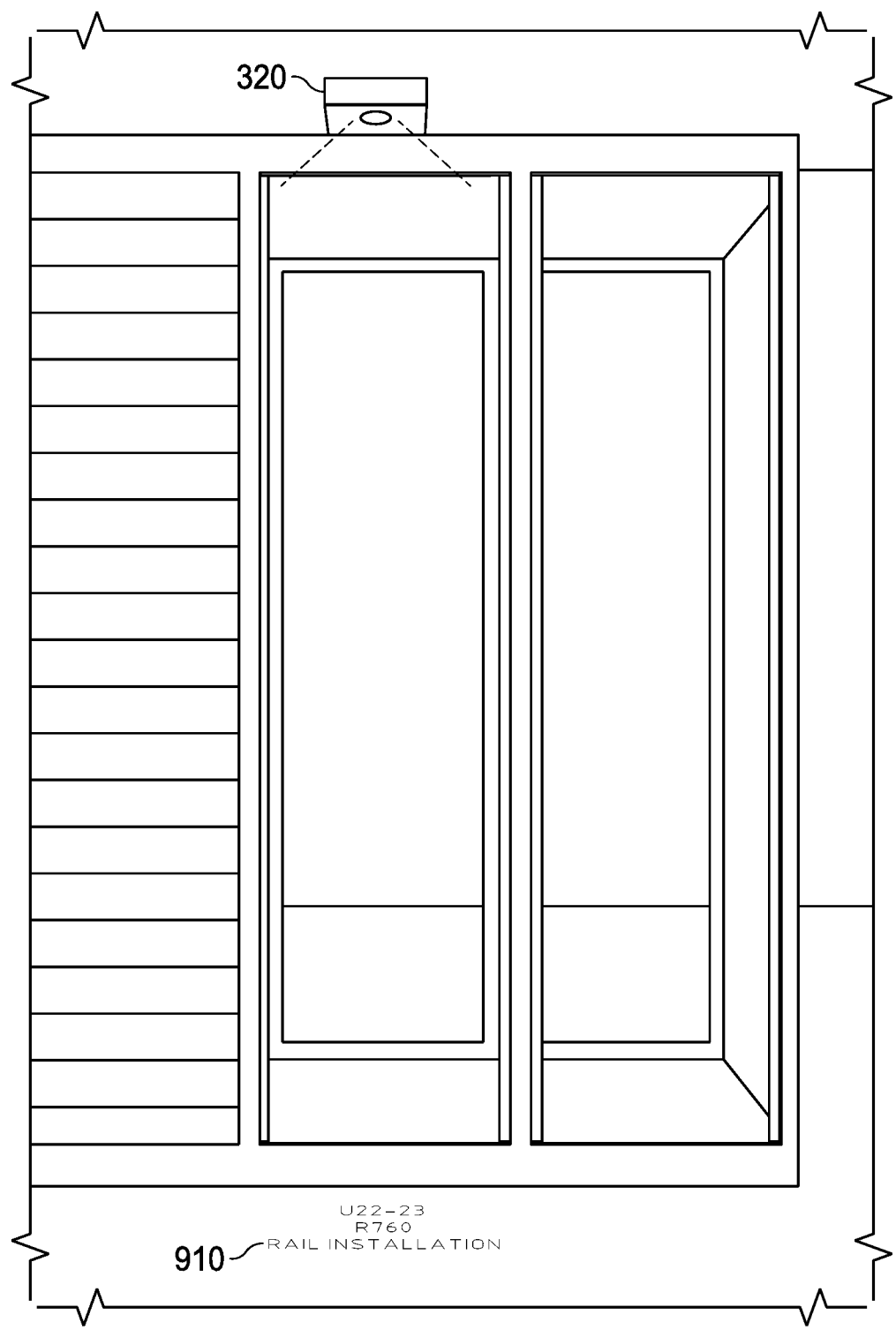
FIGS. 9A-9P show an example projected equipment system install operation.
Figure 9B:
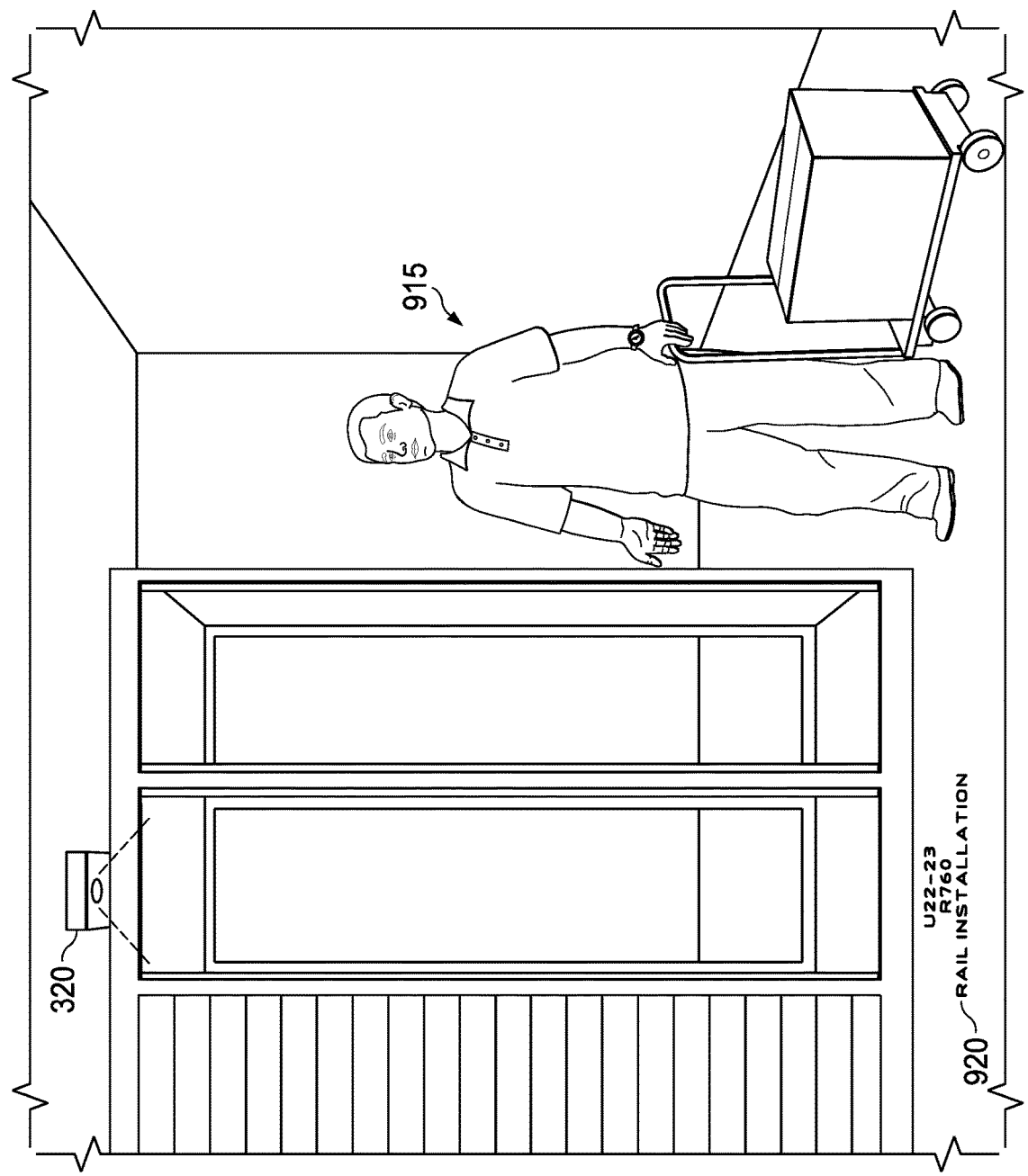
Figure 9C:
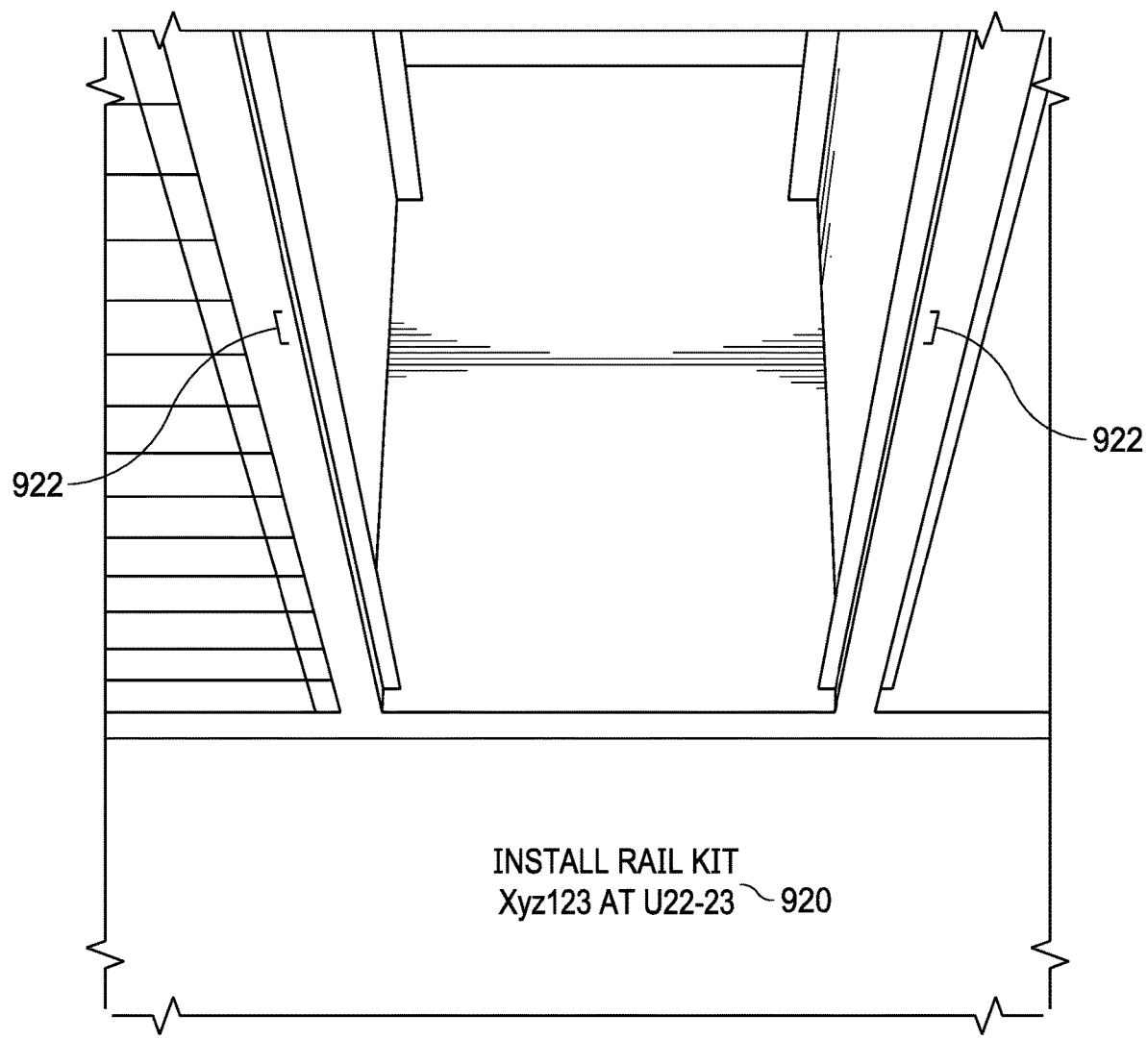
Figure 9D:
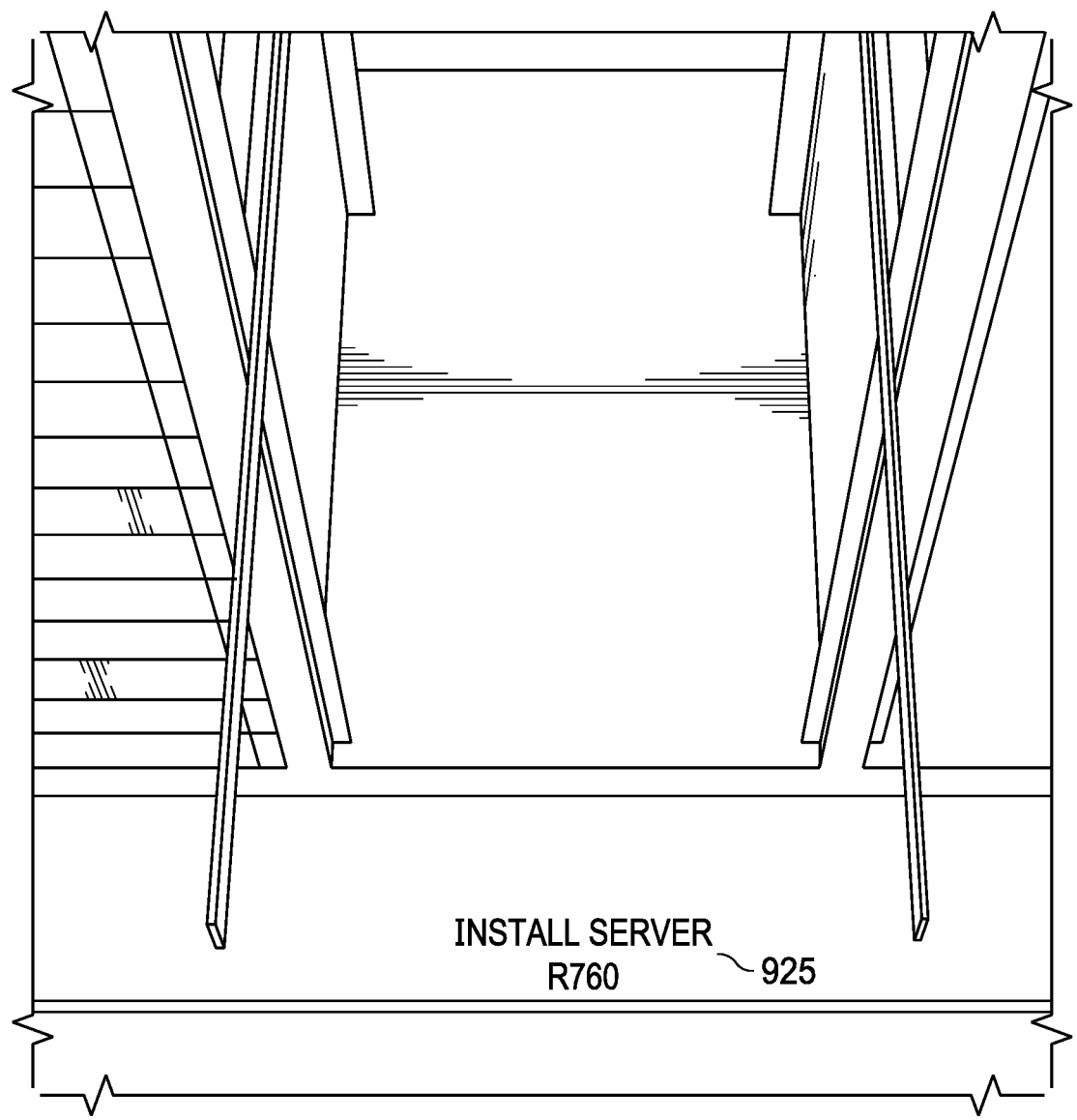
Figure 9E:
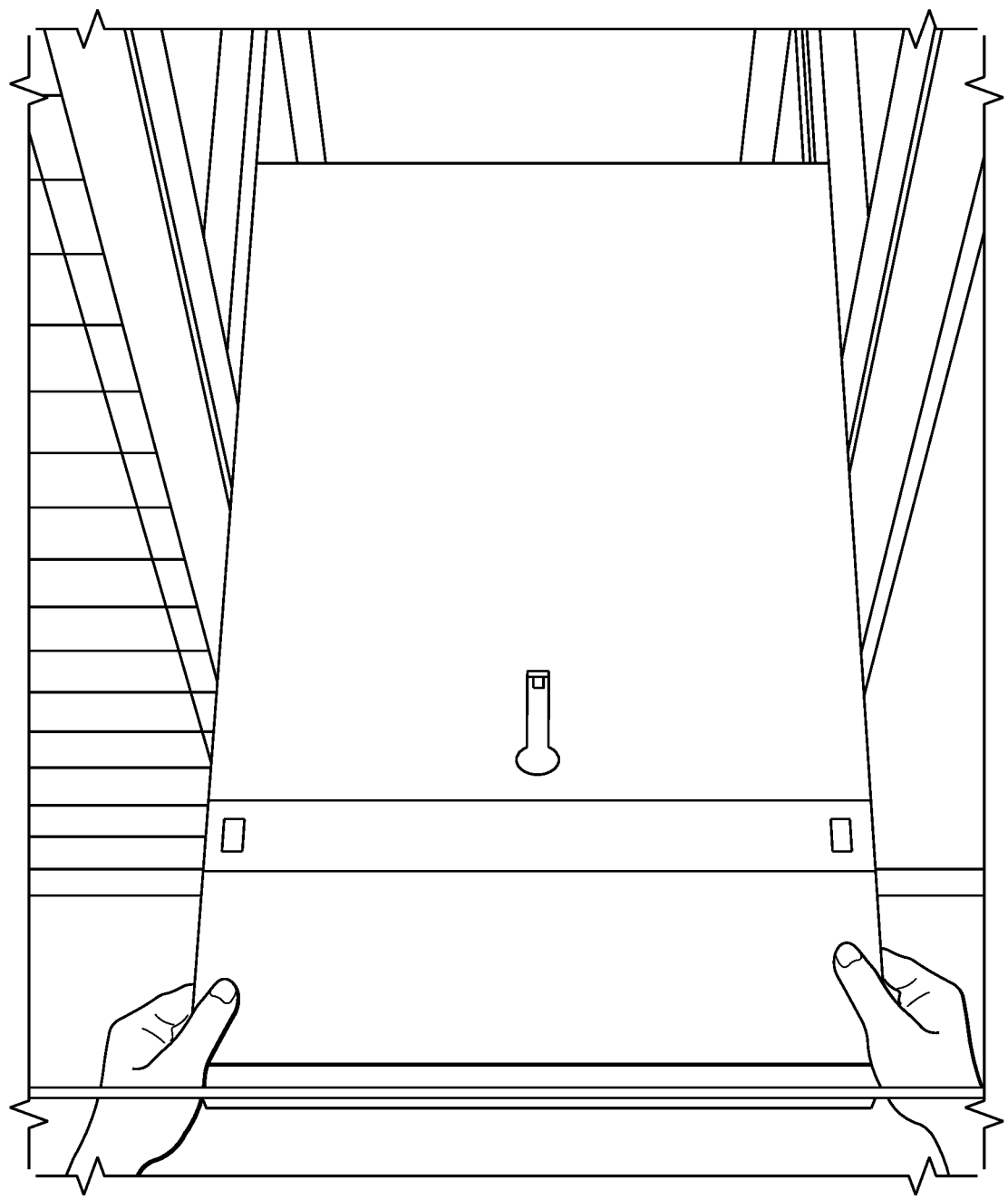
Figure 9F:
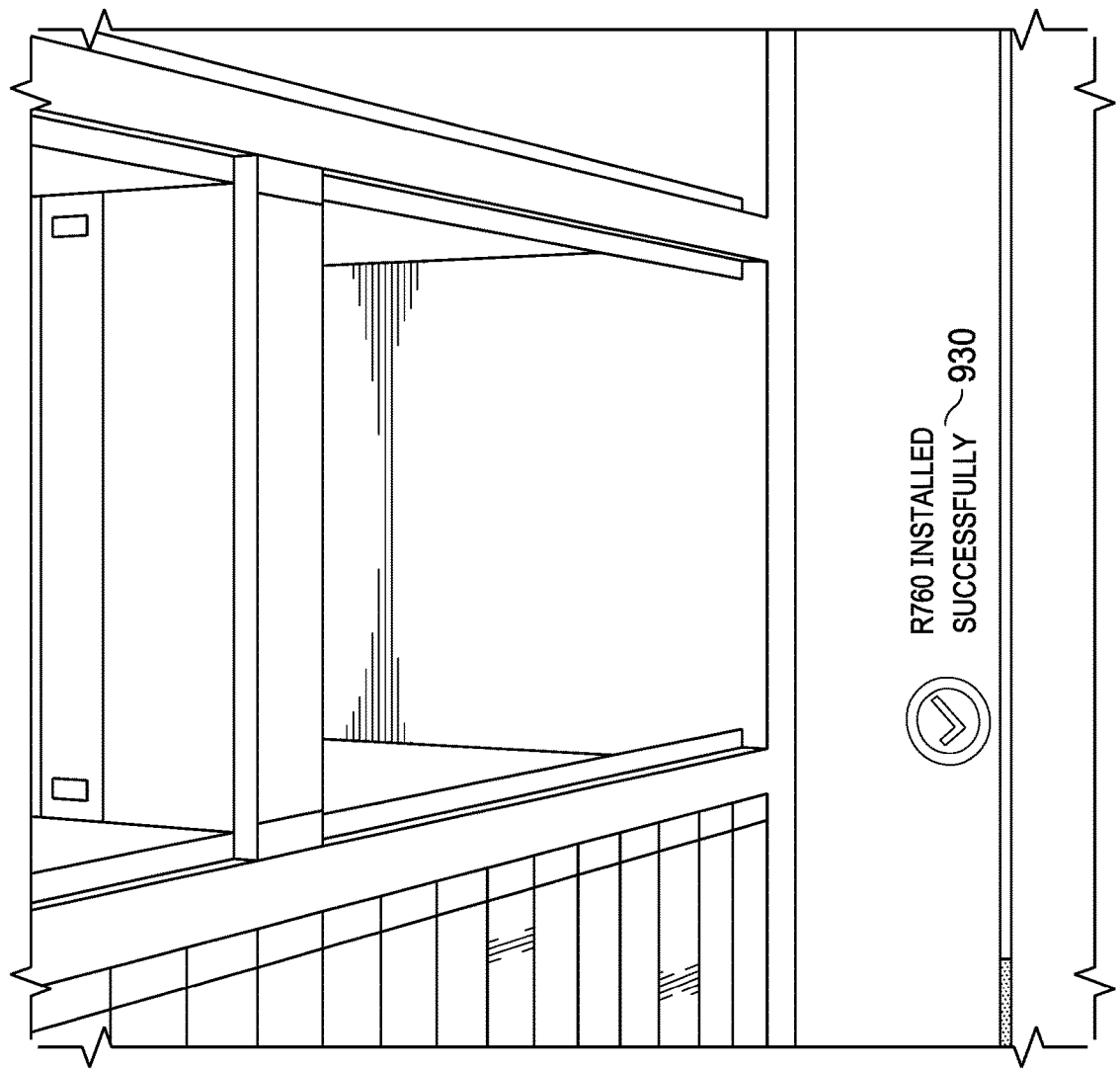
Figure 9G:
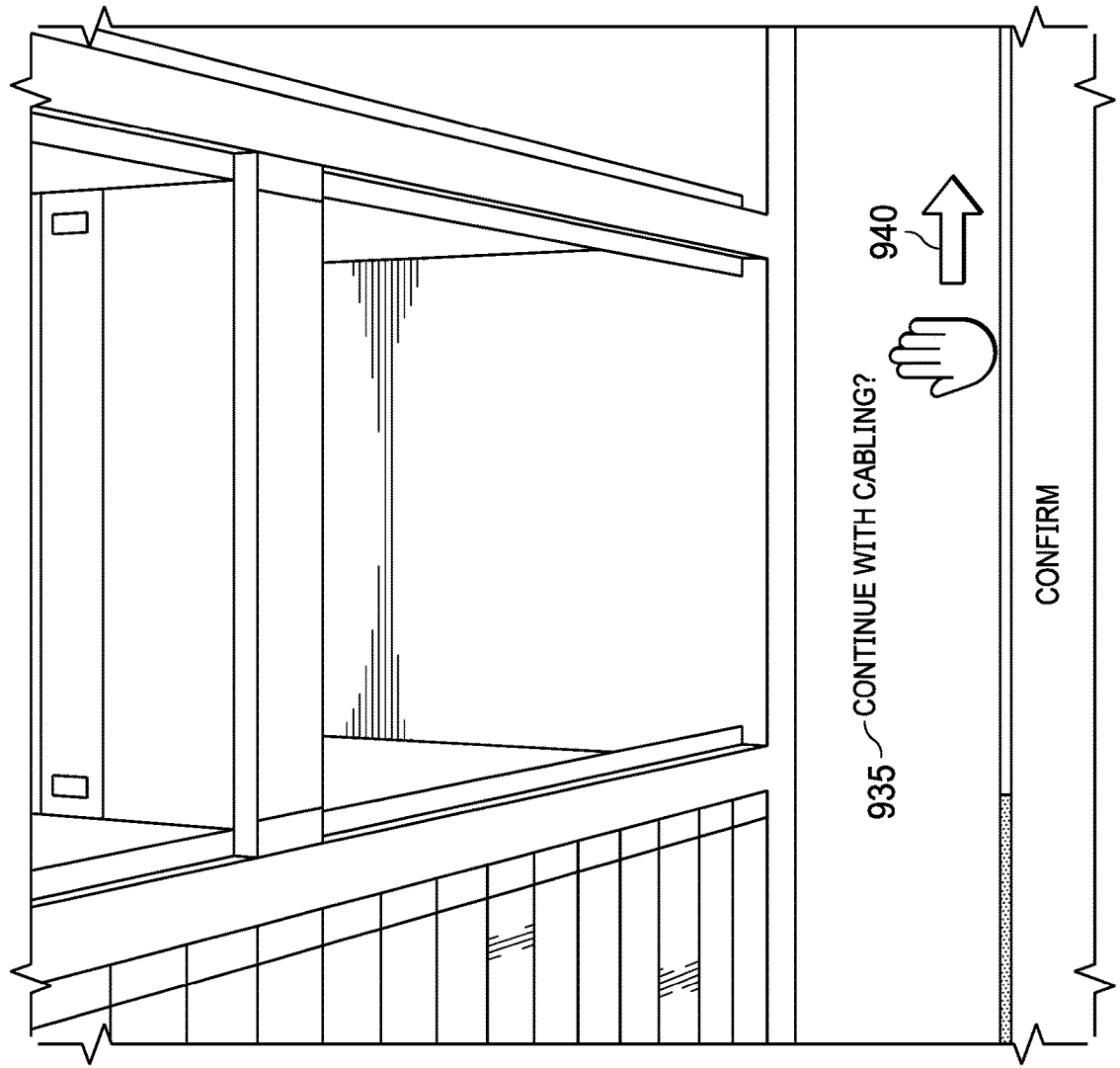
Figure 9H:
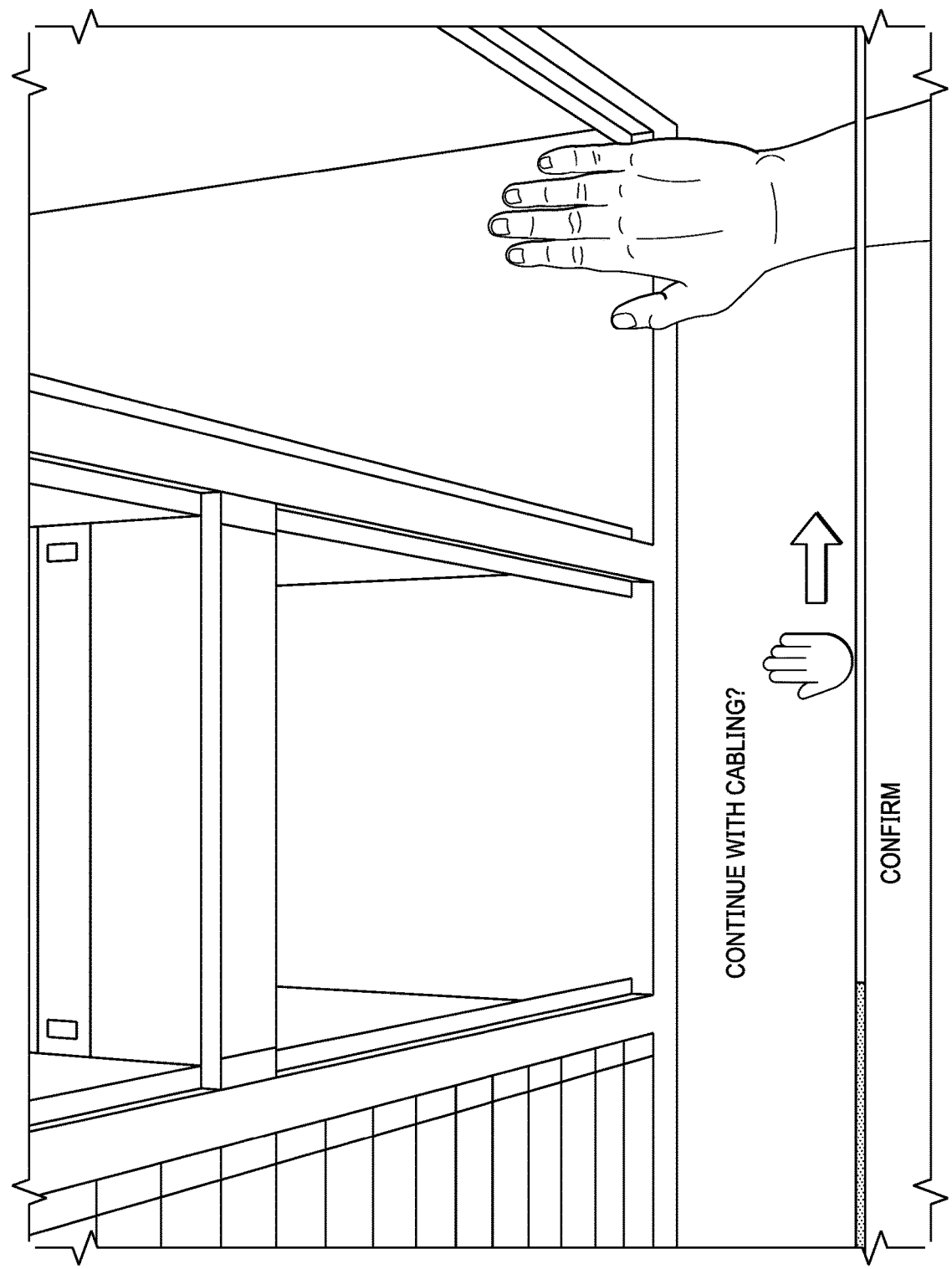
Figure 9I:
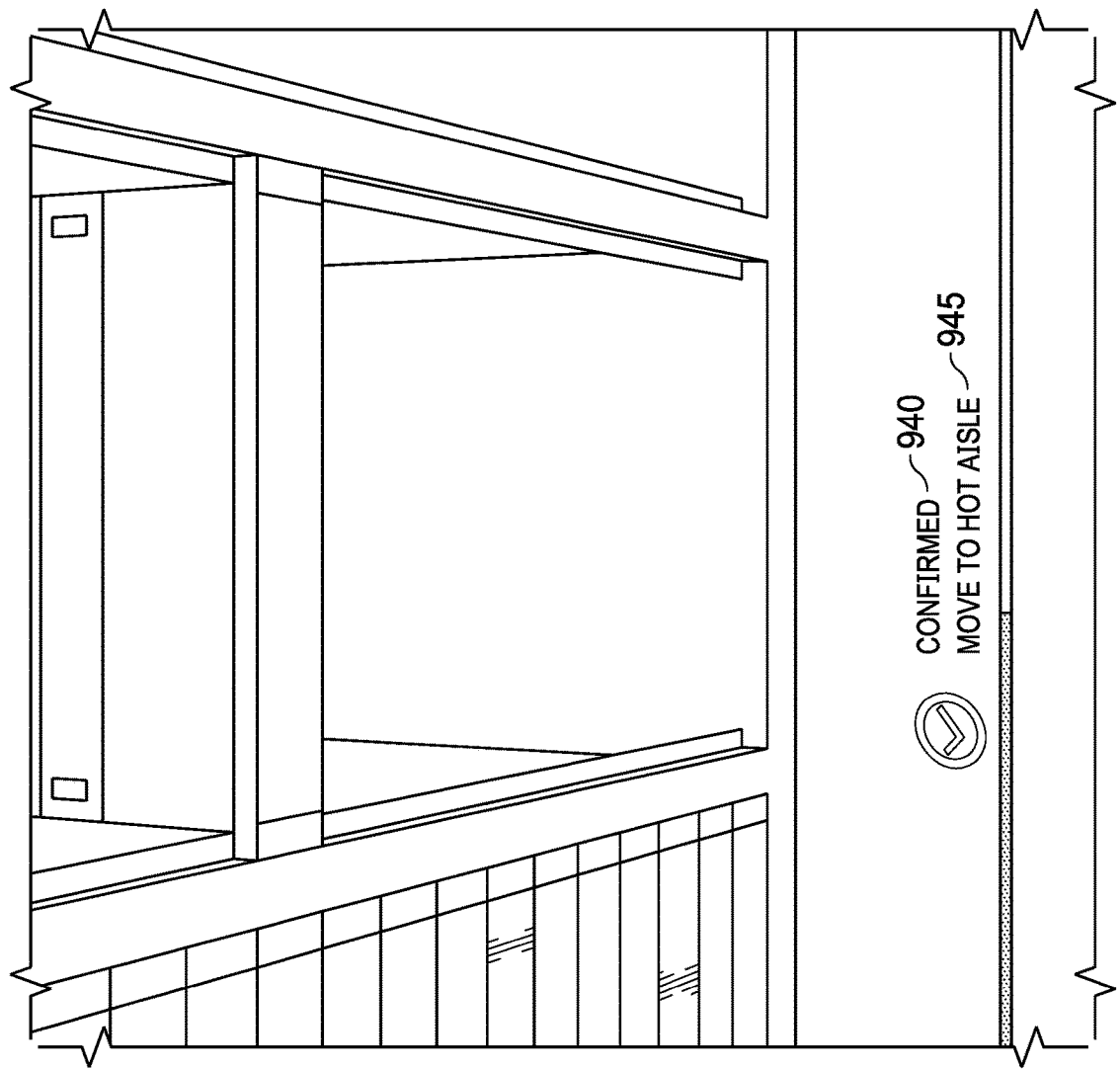
Figure 9J:
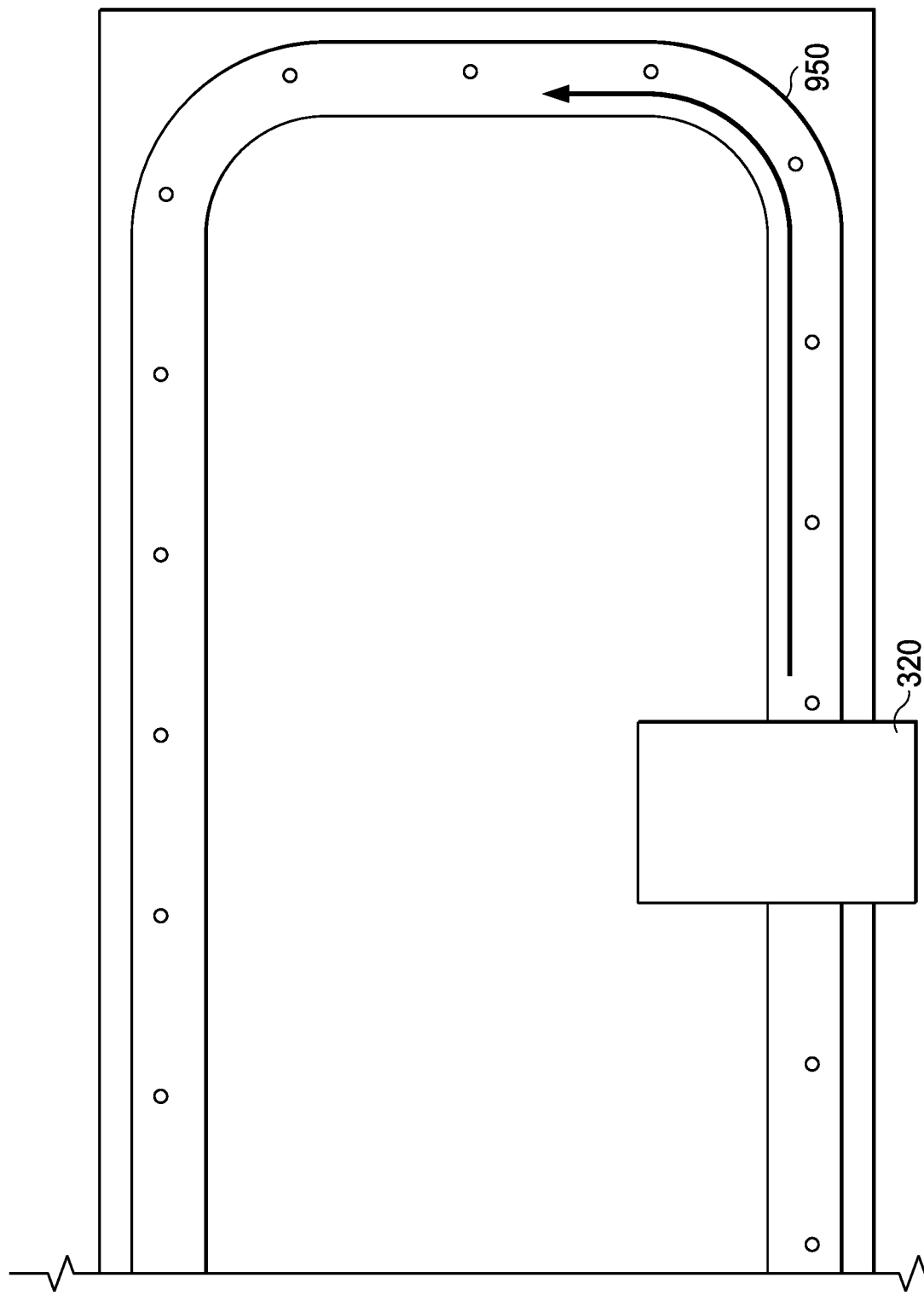
Figure 9K:
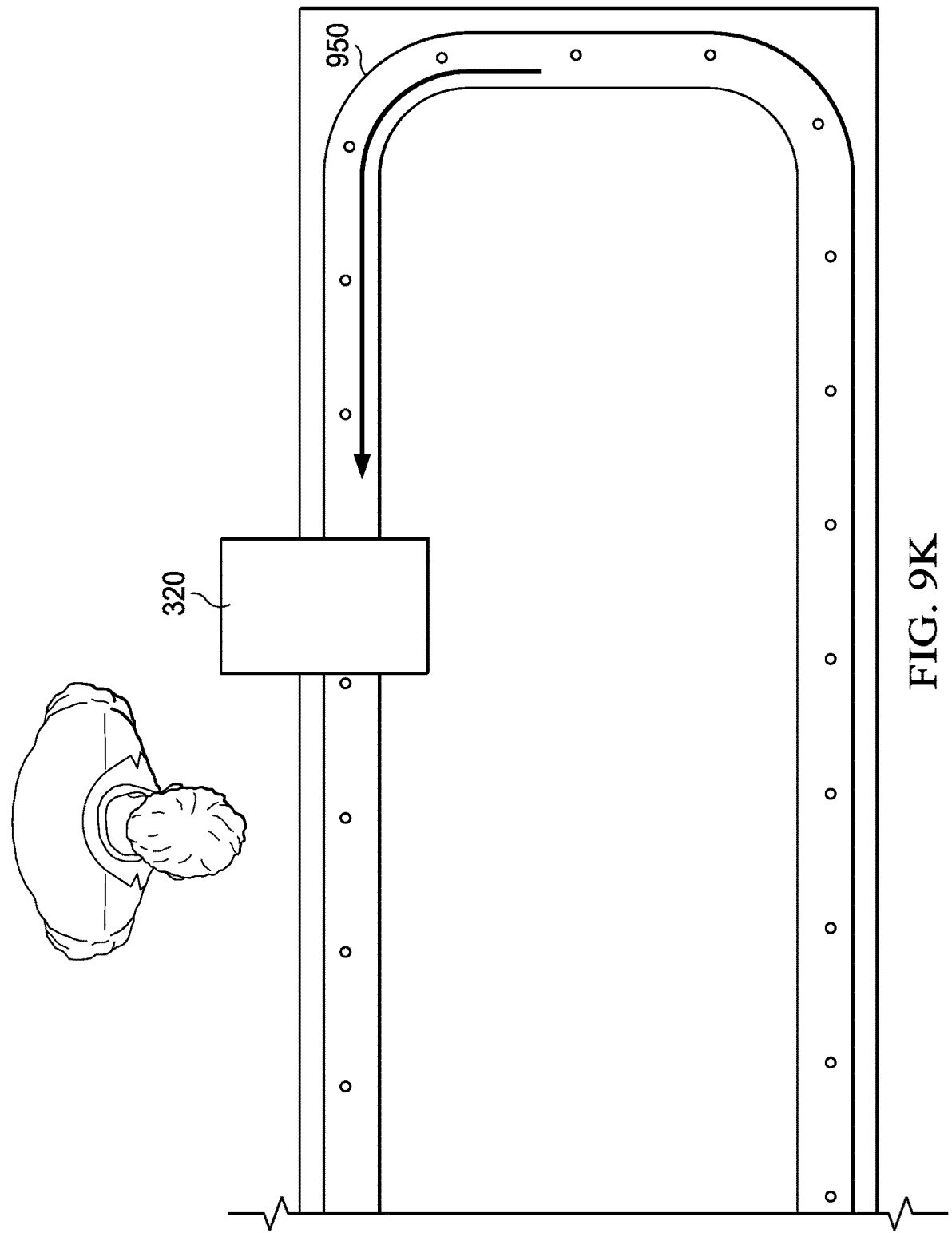
Figure 9L:
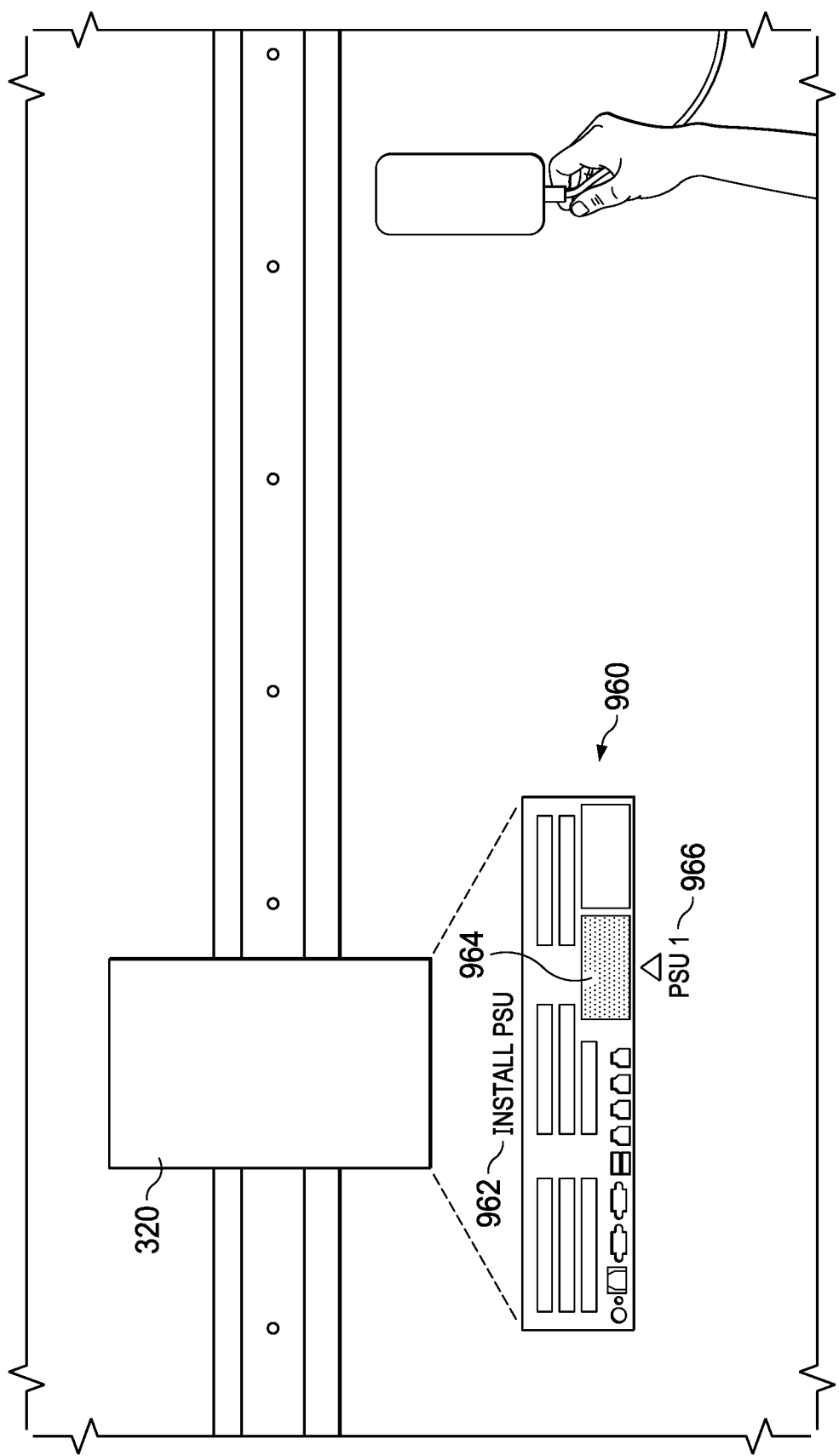
Figure 9M:
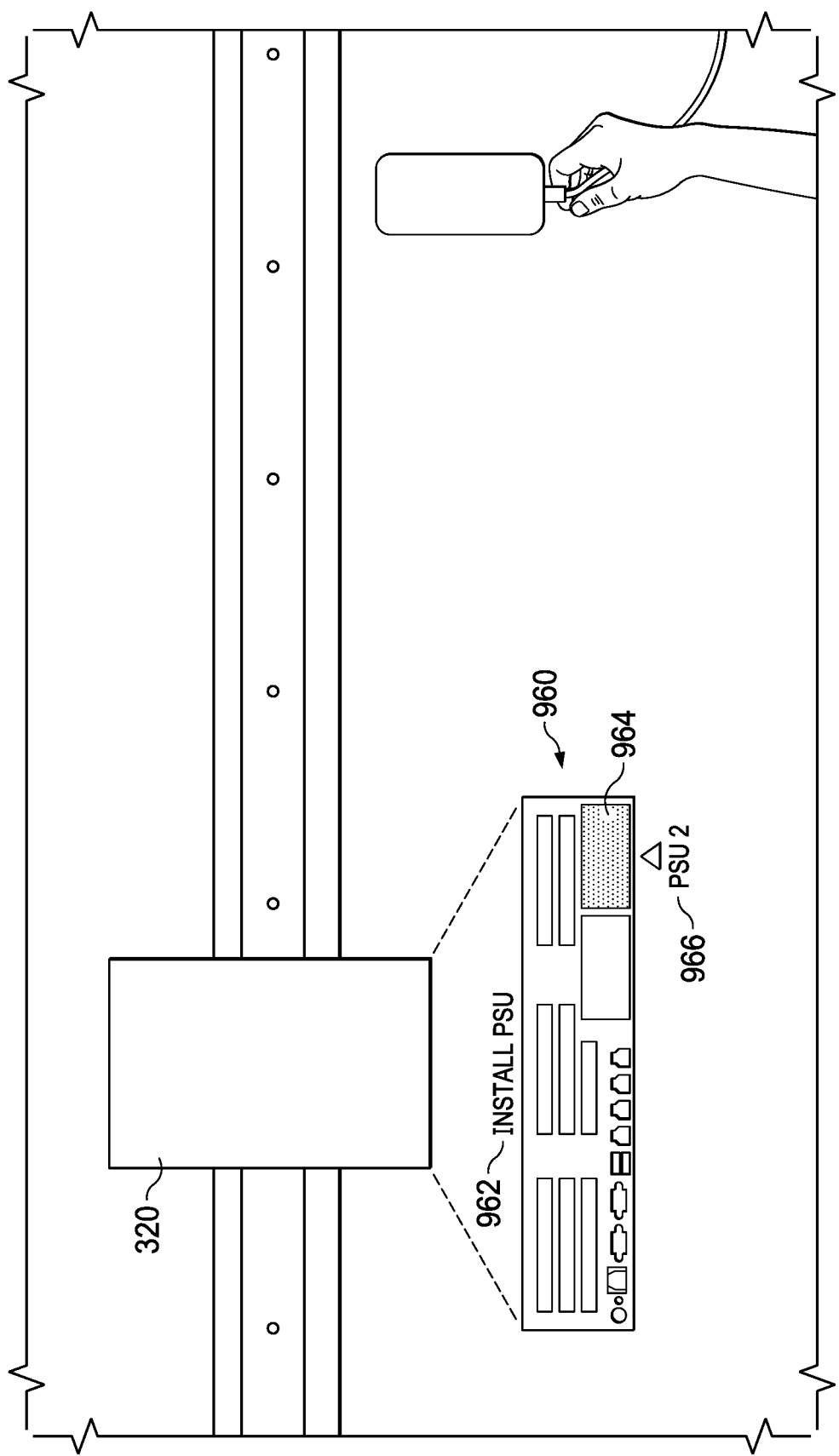
Figure 9N:
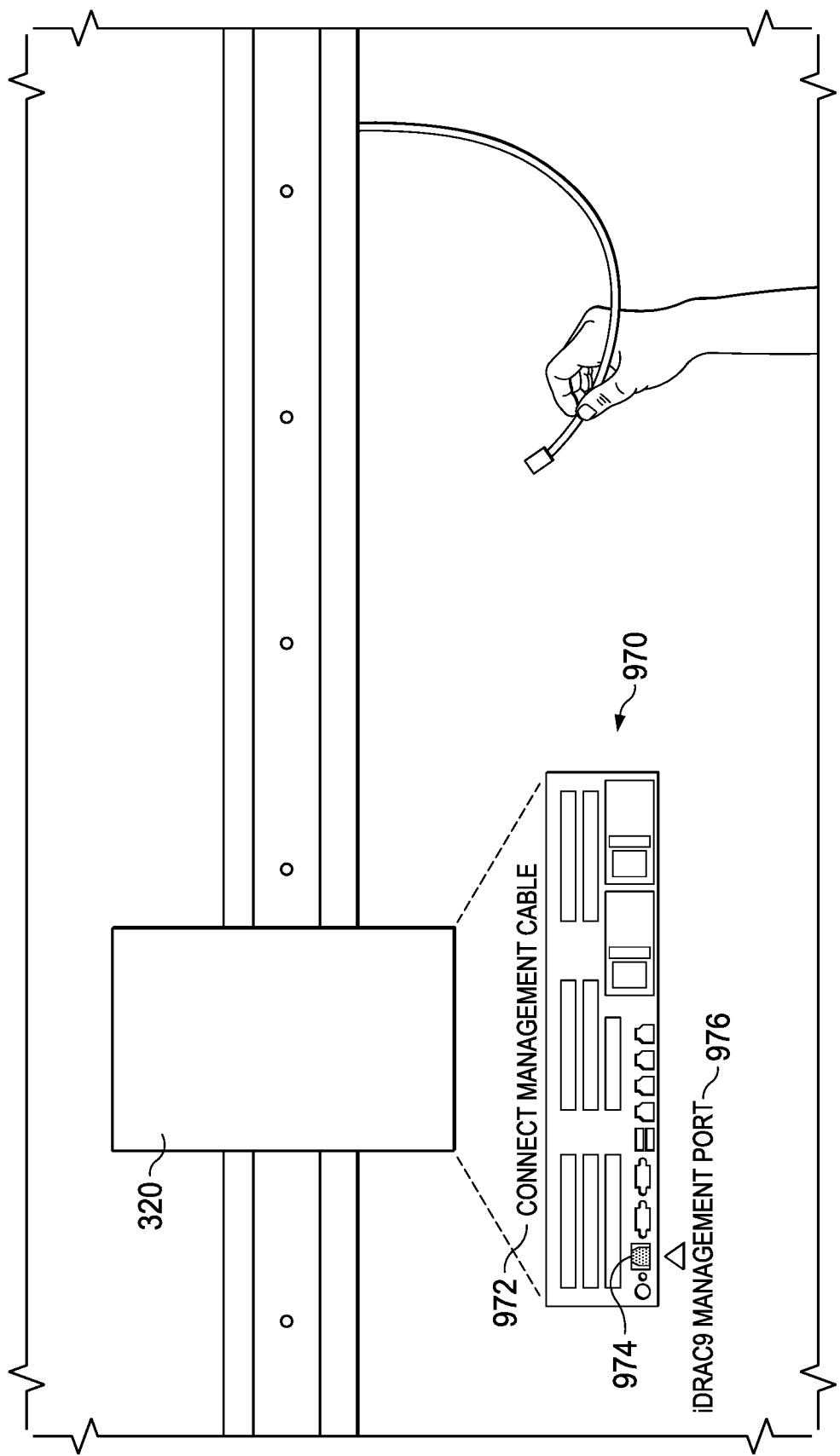
Figure 9O:
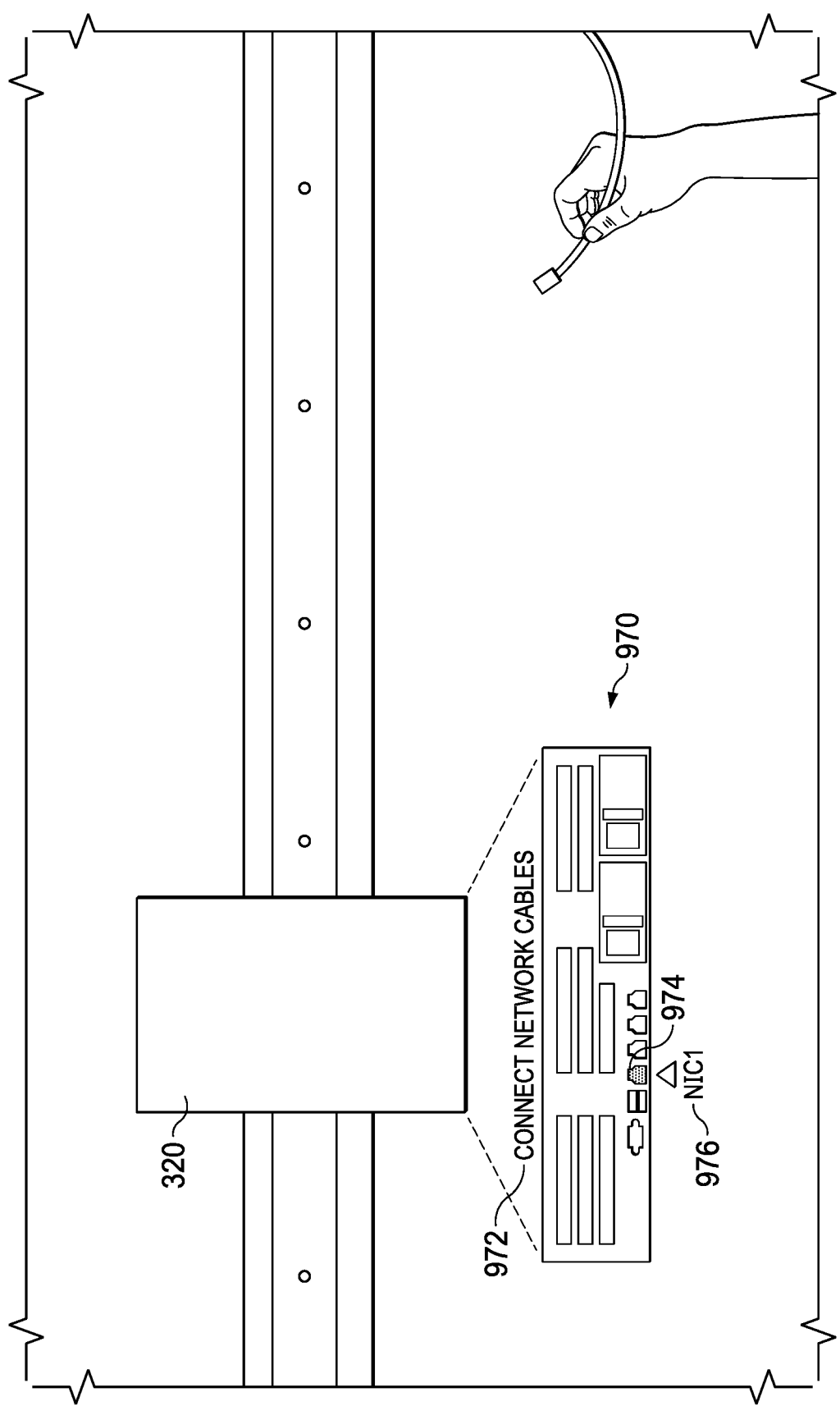

FIGS. 9A-9O show an example projected equipment system install operation. More specifically, referring to FIGS. 9A, 9B and 9C, the projected equipment system install operation begins with the AR projection system 320 projecting a bold information message 910 onto the floor in front of a rack for which a system is to be installed. The bold information message 910 provides an indication of where the system to be installed is located within the IT environment. The AR content is visible in any lighting conditions with graphics that facilitate discoverability of a system needing service. The AR content includes legible service information.

In certain embodiments the AR content can alter depending on IT service personnel proximity, detected by motion detection sensors. For example, a one distance (e.g., a distance of over 10 feet), a bold warning message (e.g., message 910) is projected to attract the attention of the IT service personnel 915. At another distance (e.g., a distance of less than 10 feet), a more detailed message (e.g., message 920) is projected to provide more information regarding one or more of information regarding the type of system to be installed, a location within a rack where the system is to be installed and a system identifier (e.g., a service tag) of the system to be installed by the IT service personnel 915. In certain embodiments, the AR content also includes an indication 922 corresponding to the physical location within the rack where the system is to be installed.

Referring to FIGS. 9D, 9E, 9F, 9G, 9H and 9I, when the AR projection system 320 determines that the action was completed by the IT service personnel (e.g., Install Rail Kit), the AR projection system 320 projects another detailed message 925 regarding the next action to be performed during the projected equipment system install operation. The AR projection system 320 then determines that the action was completed by the IT service personnel (see e.g., FIG. 9E). The AR projection system 320 then projects a status message 930 (see e.g., FIG. 9F) followed by a status inquiry message 935 (see e.g., FIG. 9G). In certain embodiments the status inquiry message 935 includes instructions for an action to be taken by the IT service personnel 915. The AR projection system 320 then pauses projecting AR content while awaiting the IT service personnel 915 to perform an indicated action (e.g., a hand swipe). When the AR projection system 320 determines the IT service personnel performed by indicated action (see e.g., FIG. 9H) the AR projection system 320 presents a status message 940 (e.g., confirmed) along with instructional content 945.

Referring to FIGS. 9J and 9K, the AR projection system 320 moves to the appropriate position above the hot aisle portion of the rack into which the system is being installed. In certain embodiments, the appropriate position is a location contiguous with the rack into which the system is being installed (i.e., over a rack that is adjacent to the rack into which the system is being installed) (see e.g., FIG. 9K). In certain embodiments, the AR projection system 320 moves along a rail system 950 installed on the top of a rack system within the IT environment. In various embodiments, each rack system includes a respective rail system 950 along which the AR projection system moves. The means by which the AR projection system 320 moves along the rail system 950 is a matter of design choice.

Referring to FIGS. 9L and 9M, AR projection system 320 projects a detailed message 960 regarding the next action to be performed during the projected equipment system install operation. In various embodiments, the detailed message includes instruction message of the action to be performed 962, a pictograph indication 964 as well as a component identifier 966 for the component associated with the action to be performed (see e.g. FIG. 9L). The AR projection system 320 projects another detailed message 960 regarding the next action to be performed during the projected equipment system install operation. In various embodiments, the detailed message includes instruction message of the action to be performed 962, a pictograph indication 964 as well as a component identifier 966 for the component associated with the action to be performed (see e.g. FIG. 9M). These messages may repeat until all of the components for this step are installed.

Referring to FIGS. 9N and 9O, AR projection system 320 projects a detailed message 970 regarding the next action to be performed during the projected equipment system install operation. In various embodiments, the detailed message includes instruction message of the action to be performed 972, a pictograph indication 974 of where the cable should be connected as well as a component identifier 976 for the component associated with the action to be performed (see e.g. FIG. 9N). The AR projection system 320 projects another detailed message 970 regarding the next action to be performed during the projected equipment system install operation. In various embodiments, the detailed message includes instruction message of the action to be performed 972, a pictograph indication 974 of where the cable should be connected as well as a component identifier 976 for the component associated with the action to be performed (see e.g. FIG. 9O). These messages may repeat until all of the cabling for this step is connected.

Figure 9P:
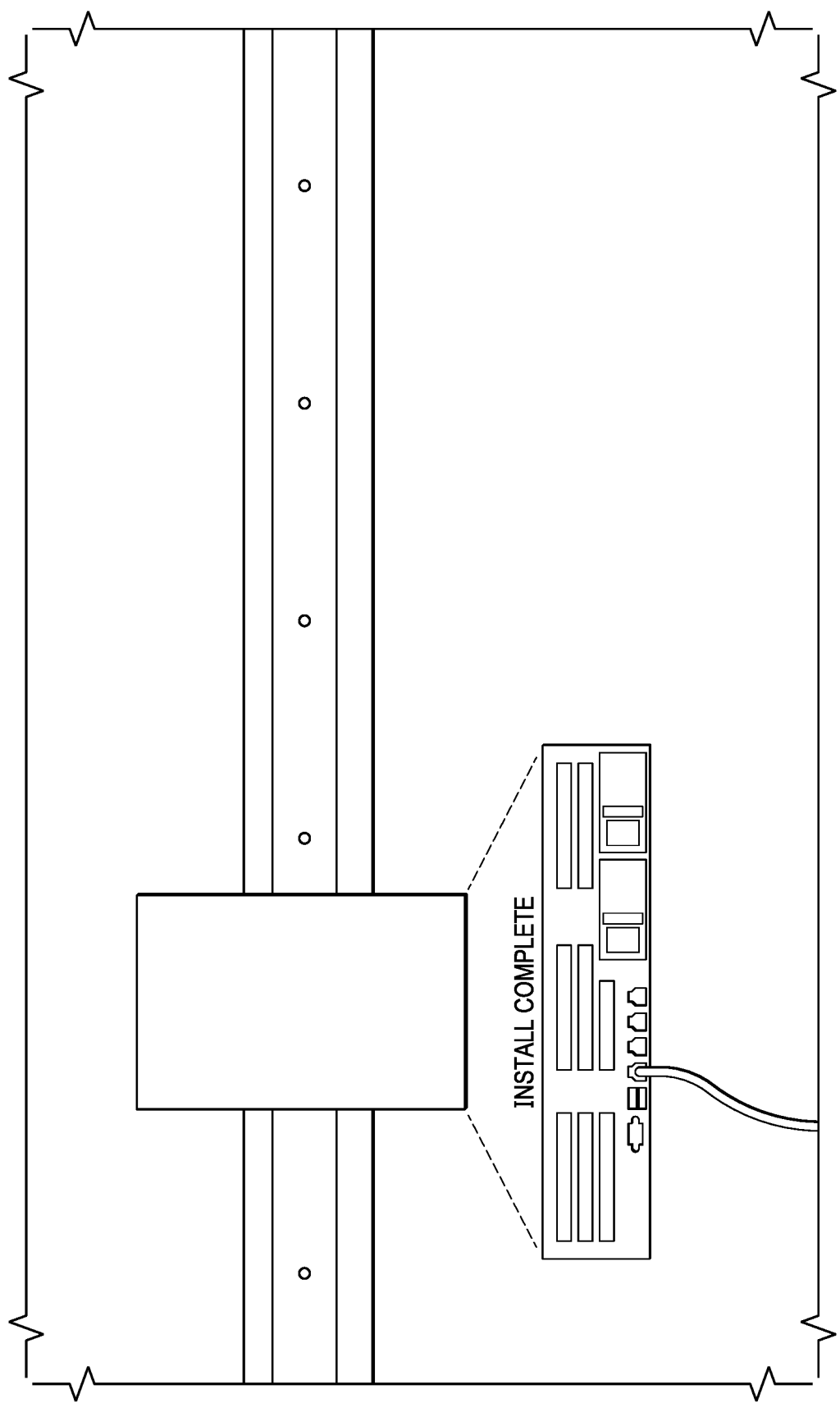

Referring to FIG. 9P, the AR projection system 320 projects an informational message 980 indicating the status of the system install operation.

The projected equipment information operation can provide AR content to intuitively guide a user through a troubleshooting operation. During a troubleshooting operation, the projected equipment AR operation can provide assistance with indicating a failed part, enabling a user to shut down the failed part, displaying instructions to replace the part, displaying touchpoints to avoid touching, and displaying when the operation is completed successfully.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a projected equipment operation within an information technology (IT) environment, comprising:
   receiving equipment information regarding an information handling system within the IT environment;
   identifying AR content associated with the equipment information regarding the information handling system within the IT environment; and
   projecting the AR content associated with the equipment information onto a physical device associated with a data center rack within the IT environment, a combination of the AR content and the physical device providing a composite view, the composite view providing a hands free and device free provision of the equipment information, the projecting being performed by an AR projection system, the AR projection system being mounted to a rail system installed on a top portion of a rack system of the IT environment, the AR projection system moving to an appropriate position of the IT environment via the rail system, the appropriate position being a location contiguous with the data center rack associated with the physical device.

2. The method of claim 1, wherein:
   the projected equipment information operation proactively assists IT service personnel to locate a particular information handling system within the IT environment.

3. The method of claim 1, further comprising:
   detecting when an IT service personnel is within a predetermined distance of the information handling system associated with the equipment information; and,
   projecting second AR content associated with the equipment information regarding the information handling system within the IT environment when the IT service personnel is within the predetermined distance of the information handling system associated with the equipment information.

4. The method of claim 1, wherein:
   the equipment information regarding an information handling system within the IT environment comprises information regarding an equipment service operation.

5. The method of claim 1, wherein:
   the equipment information regarding an information handling system within the IT environment comprises information regarding a component install service operation.

6. The method of claim 1, wherein:
   the equipment information regarding an information handling system within the IT environment comprises information regarding a system install service operation.

7. A system comprising:
   a processor;
   a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving equipment information regarding an information handling system within an IT environment;

identifying AR content associated with the equipment information regarding the information handling system within the IT environment; and projecting the AR content associated with the equipment information onto a physical device associated with a data center rack within the IT environment, a combination of the AR content and the physical device providing a composite view, the composite view providing a hands free and device free provision of the equipment information, the projecting being performed by an AR projection system, the AR projection system being mounted to a rail system installed on a top portion of a rack system of the IT environment, the AR projection system moving to an appropriate position of the IT environment via the rail system, the appropriate position being a location contiguous with the data center rack associated with the physical device.

8. The system of claim 7, wherein:
the projected equipment information operation proactively assists IT service personnel to locate a particular information handling system within the IT environment.

9. The system of claim 7, wherein the instructions executable by the processor are further configured for:
detecting when an IT service personnel is within a predetermined distance of the information handling system associated with the equipment information; and,
projecting second AR content associated with the equipment information regarding the information handling system within the IT environment when the IT service personnel is within the predetermined distance of the information handling system associated with the equipment information.

10. The system of claim 7, wherein:
the equipment information regarding an information handling system within the IT environment comprises information regarding an equipment service operation.

11. The system of claim 7, wherein:
the equipment information regarding an information handling system within the IT environment comprises information regarding a component install service operation.

12. The system of claim 7, wherein:
the equipment information regarding an information handling system within the IT environment comprises information regarding a system install service operation.

13. A non-transitory, computer-readable storage medium embodying computer program code, the computer program code comprising computer executable instructions configured for:

receiving equipment information regarding an information handling system within the IT environment;

identifying AR content associated with the equipment information regarding the information handling system within the IT environment; and projecting the AR content associated with the equipment information onto a physical device associated with a data center rack within the IT environment, a combination of the AR content and the physical device providing a composite view, the composite view providing a hands free and device free provision of the equipment information, the projecting being performed by an AR projection system, the AR projection system being mounted to a rail system installed on a top portion of a rack system of the IT environment, the AR projection system moving to an appropriate position of the IT environment via the rail system, the appropriate position being a location contiguous with the data center rack associated with the physical device.

14. The non-transitory, computer-readable storage medium of claim 13, wherein:
the projected equipment information operation proactively assists IT service personnel to locate a particular information handling system within the IT environment.

15. The non-transitory, computer-readable storage medium of claim 13, wherein the computer executable instructions are further configured for:
detecting when an IT service personnel is within a predetermined distance of the information handling system associated with the equipment information; and,
projecting second AR content associated with the equipment information regarding the information handling system within the IT environment when the IT service personnel is within the predetermined distance of the information handling system associated with the equipment information.

16. The non-transitory, computer-readable storage medium of claim 13, wherein:
the equipment information regarding an information handling system within the IT environment comprises information regarding an equipment service operation.

17. The non-transitory, computer-readable storage medium of claim 13, wherein:
the equipment information regarding an information handling system within the IT environment comprises information regarding a component install service operation.

18. The non-transitory, computer-readable storage medium of claim 13, wherein:
the equipment information regarding an information handling system within the IT environment comprises information regarding a system install service operation.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *